United States Patent
Keating et al.

(10) Patent No.: US 10,182,357 B1
(45) Date of Patent: Jan. 15, 2019

(54) SYSTEM AND METHOD FOR BOTTOM-UP INVOCATION OF CONTROL SIGNAL REPEATERS IN A MESH LIGHTING NETWORK

(71) Applicant: Echelon Corporation, Santa Clara, CA (US)

(72) Inventors: Mark Keating, Clearwater, FL (US); Jwalant Dholakia, Safety Harbor, FL (US); Jonathan Lloyd, Sacramento, CA (US)

(73) Assignee: Echelon Corporation, Santa Clara, CA (US)

( * ) Notice: Subject to any disclaimer, the term of this patent is extended or adjusted under 35 U.S.C. 154(b) by 0 days.

(21) Appl. No.: 15/709,935

(22) Filed: Sep. 20, 2017

(51) Int. Cl.
*H04W 24/02* (2009.01)
*H05B 37/02* (2006.01)
*H04W 88/04* (2009.01)
*H04W 84/18* (2009.01)

(52) U.S. Cl.
CPC ............ *H04W 24/02* (2013.01); *H04W 84/18* (2013.01); *H04W 88/04* (2013.01); *H05B 37/0272* (2013.01)

(58) Field of Classification Search
CPC ..... G06Q 30/04; H04L 67/12; H05B 37/0272
USPC .......... 455/7, 13.1, 24, 41.1, 41.2, 420, 423, 455/452.2, 436, 13.4, 513, 67.11, 115.1; 370/18, 338, 431, 254, 315, 350; 315/151, 131, 291, 312; 700/295, 275; 709/220; 340/870; 701/491
See application file for complete search history.

(56) References Cited

U.S. PATENT DOCUMENTS

| | | | |
|---|---|---|---|
| 8,290,710 B2 | 10/2012 | Cleland et al. | |
| 2005/0116667 A1* | 6/2005 | Mueller | E04F 13/08 315/312 |
| 2007/0147338 A1* | 6/2007 | Chandra | H04W 8/245 370/350 |
| 2008/0049779 A1* | 2/2008 | Hopmann | H04L 12/2807 370/431 |

(Continued)

FOREIGN PATENT DOCUMENTS

| | | |
|---|---|---|
| EP | 2503853 | 9/2012 |
| EP | 2592908 | 8/2014 |

(Continued)

OTHER PUBLICATIONS

Rajput, K. Y., et al. "Intelligent street lighting system using gsm." International Journal of Engineering Science Invention 2.3 (2013): 60-69.

(Continued)

*Primary Examiner* — Tan H Trinh
(74) *Attorney, Agent, or Firm* — Locke Lord LLP

(57) ABSTRACT

Example embodiments of the invention efficiently organize, control and prioritize a distributed lighting network. A mesh lighting network is organized from the bottom up into groups of lighting devices with control signal repeaters fanning out control signals to each group. Each lighting device is capable of forwarding control signals to additional lighting devices. During build-out of the mesh network, as new lighting devices are installed, the control network automatically selects a device whose repeater function will provide the most reliable and efficient distribution of control signals to the new group of devices being installed.

21 Claims, 14 Drawing Sheets

(56) References Cited

U.S. PATENT DOCUMENTS

| | | | | |
|---|---|---|---|---|
| 2009/0102401 | A1* | 4/2009 | Ashdown | H05B 37/0254 315/312 |
| 2010/0028003 | A1* | 2/2010 | Nakamura | H04B 10/07955 398/79 |
| 2010/0142434 | A1* | 6/2010 | Rodmell | H04W 88/02 370/315 |
| 2012/0040606 | A1* | 2/2012 | Verfuerth | H05B 37/0218 455/7 |
| 2012/0098445 | A1 | 4/2012 | Park et al. | |
| 2012/0098446 | A1* | 4/2012 | Kim | H05B 37/0272 315/193 |
| 2012/0136485 | A1* | 5/2012 | Weber | G05B 15/02 700/275 |
| 2012/0299509 | A1* | 11/2012 | Lee | H04L 41/0806 315/291 |
| 2013/0116003 | A1 | 5/2013 | Chhatbar et al. | |
| 2013/0181609 | A1* | 7/2013 | Agrawal | H05B 37/03 315/131 |
| 2013/0214687 | A1* | 8/2013 | Weaver | H05B 37/0272 315/151 |
| 2013/0234862 | A1* | 9/2013 | Toth | H04Q 9/00 340/870.03 |
| 2013/0265906 | A1* | 10/2013 | Abraham | H04W 40/246 370/254 |
| 2013/0268654 | A1 | 10/2013 | Abraham et al. | |
| 2014/0175875 | A1* | 6/2014 | Newman, Jr. | H04L 69/18 307/18 |
| 2014/0180487 | A1* | 6/2014 | Bull | H04L 12/12 700/295 |
| 2014/0293993 | A1* | 10/2014 | Ryhorchuk | H04L 67/12 370/350 |
| 2015/0071275 | A1* | 3/2015 | Yuk | H04W 48/16 370/338 |
| 2015/0214315 | A1* | 7/2015 | Fan | H01L 27/11521 257/321 |
| 2015/0369618 | A1* | 12/2015 | Barnard | H05B 37/0272 701/491 |
| 2015/0373556 | A1* | 12/2015 | Oren-Pines | H04B 10/27 398/115 |
| 2016/0094399 | A1 | 3/2016 | Kish | |
| 2016/0105791 | A1* | 4/2016 | Wang | H04W 8/005 370/335 |
| 2016/0198548 | A1* | 7/2016 | Monaci | H05B 37/0218 315/152 |
| 2016/0286629 | A1 | 9/2016 | Chen et al. | |
| 2017/0006117 | A1* | 1/2017 | Kafle | H04L 65/4084 |
| 2017/0013697 | A1* | 1/2017 | Engelen | H05B 37/0272 |
| 2017/0124856 | A1* | 5/2017 | Benien | H05B 37/0272 |
| 2017/0164332 | A1* | 6/2017 | Kim | H04W 40/246 |
| 2017/0171950 | A1* | 6/2017 | Barna | H05B 37/0272 |
| 2017/0223809 | A1* | 8/2017 | Oliver | H05B 37/0272 |
| 2017/0230928 | A1* | 8/2017 | Basu Mallick | H04W 56/0045 |
| 2017/0251541 | A1* | 8/2017 | Cavalcanti | H05B 37/0272 |
| 2017/0277147 | A1* | 9/2017 | De Vaan | H05B 37/0272 |
| 2017/0317740 | A1* | 11/2017 | Basu Mallick | H04B 7/15557 |
| 2018/0026836 | A1* | 1/2018 | Turvy, Jr. | H04W 76/10 709/220 |
| 2018/0042077 | A1* | 2/2018 | Riley | H05B 37/0227 |
| 2018/0042090 | A1* | 2/2018 | Riley | H04L 41/0813 |
| 2018/0048986 | A1* | 2/2018 | Adachi | H04W 4/70 |
| 2018/0069618 | A1* | 3/2018 | Loehr | H04B 7/15542 |
| 2018/0242228 | A1* | 8/2018 | Jung | H04W 24/10 |

FOREIGN PATENT DOCUMENTS

| | | |
|---|---|---|
| WO | WO 2014147524 | 9/2014 |
| WO | WO 2015077630 | 5/2015 |
| WO | WO 2016048428 | 3/2016 |

OTHER PUBLICATIONS

Kaleem, Zeeshan, Ishtiaq Ahmad, and Chankil Lee. "Smart and energy efficient led street light control system using ZigBee network." Frontiers of Information Technology (FIT), 2014 12th International Conference on. IEEE, 2014.

Natu, Omkar, and S. A. Chavan. "GSM based smart street light monitoring and control system." International Journal on Computer Science and Engineering 5.3 (2013): 187.

Subramanyam, B. K., K. Bhaskar Reddy, and P. Ajay Kumar Reddy. "Design and development of intelligent wireless street light control and monitoring system along with gui." International Journal of Engineering Research and Applications (IJERA) 3.4 (2013): 2115-2119.

* cited by examiner

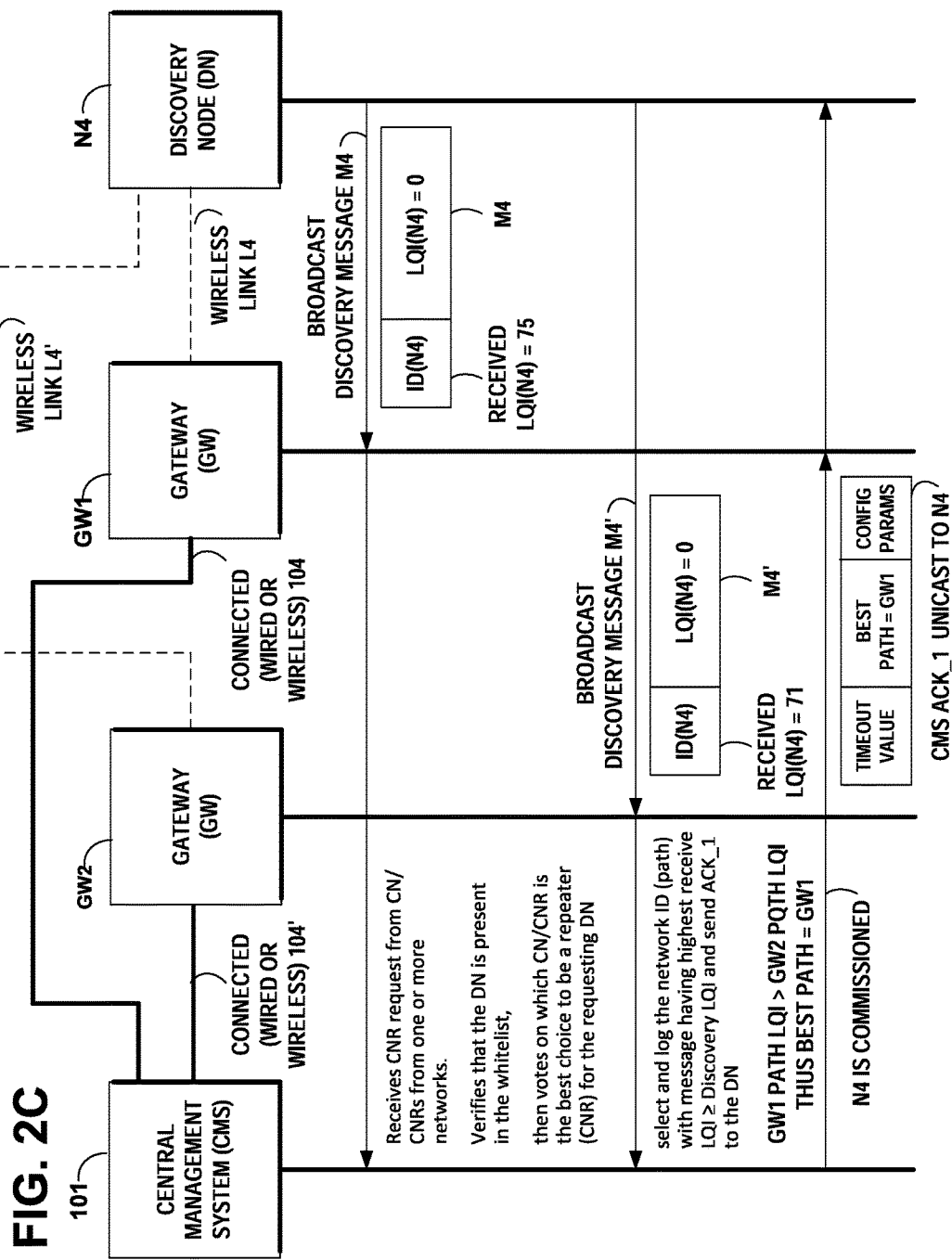

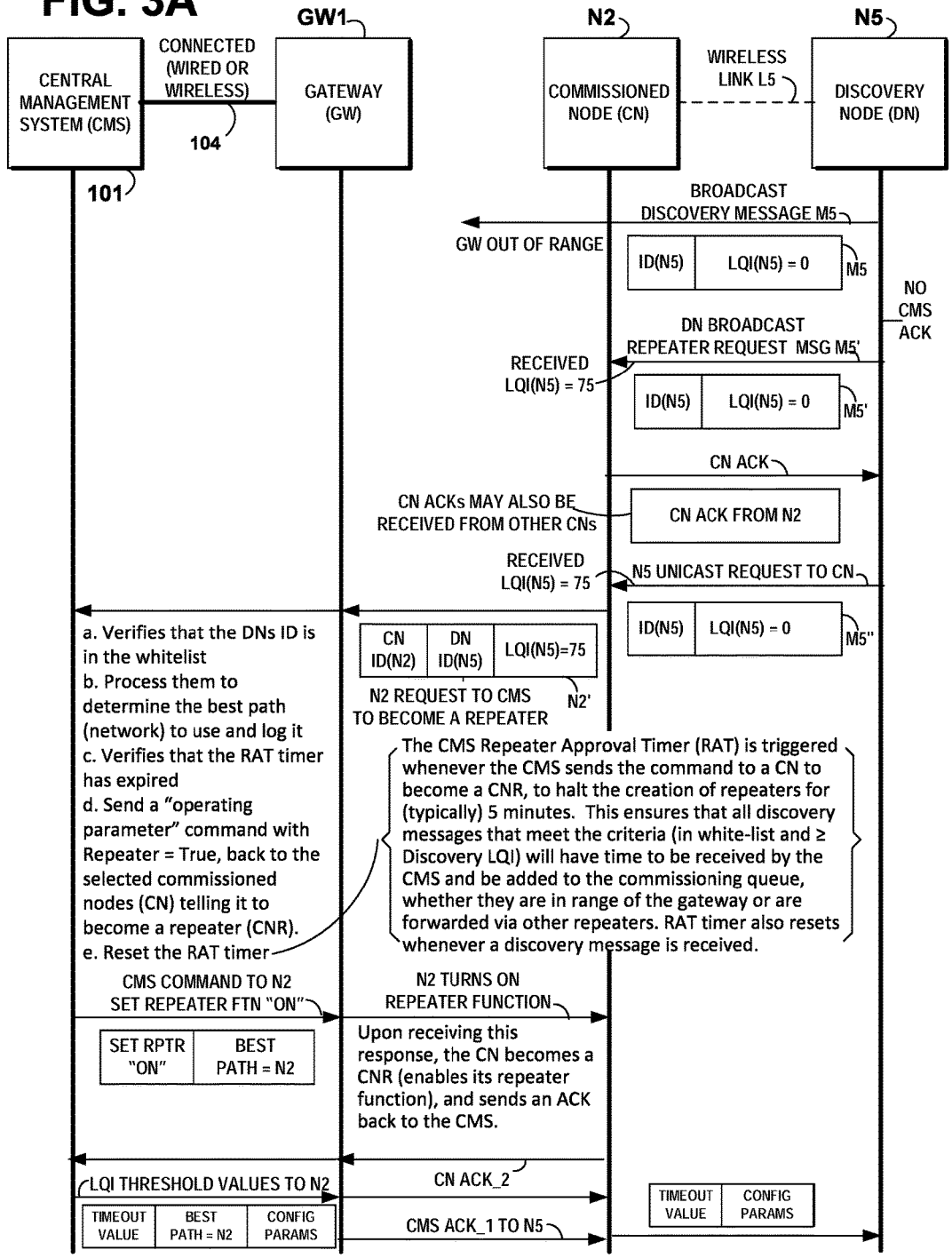

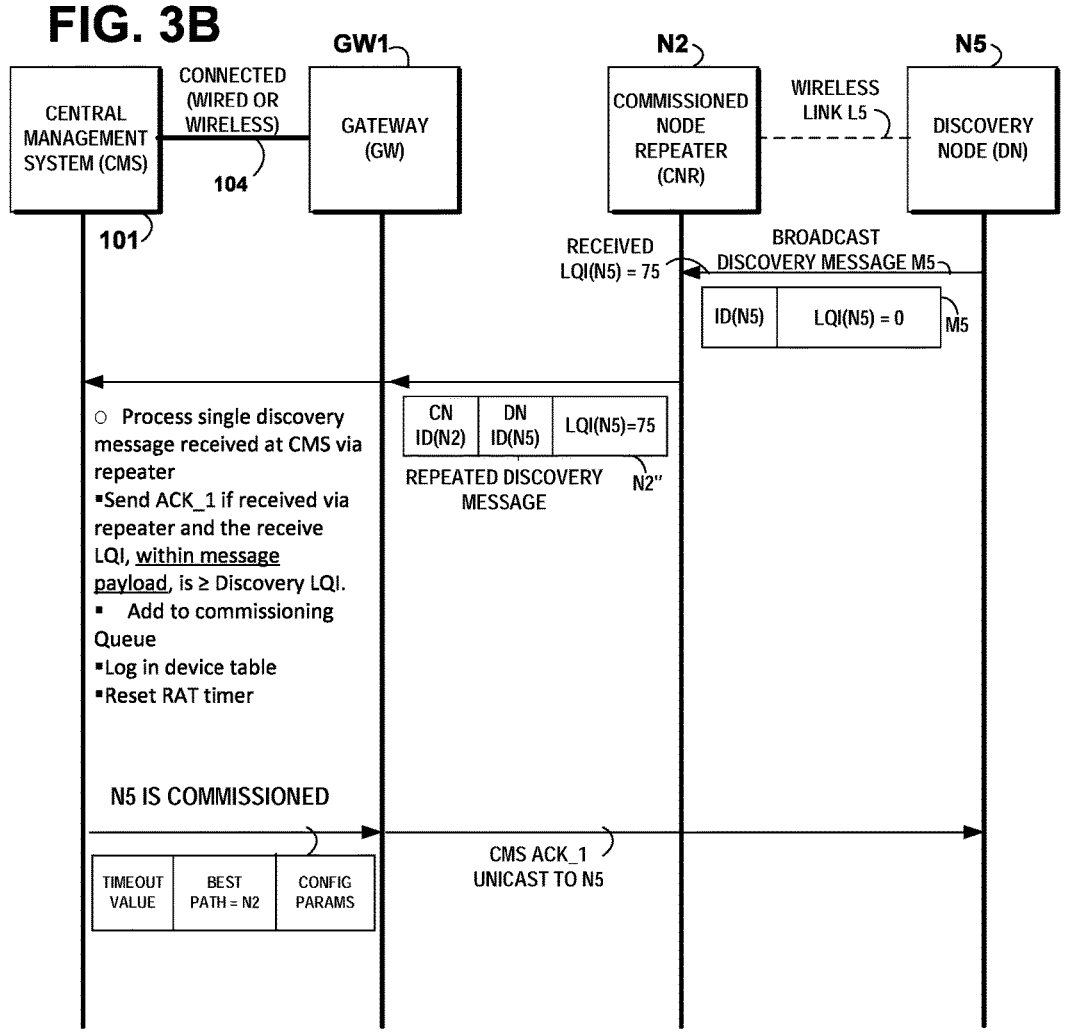

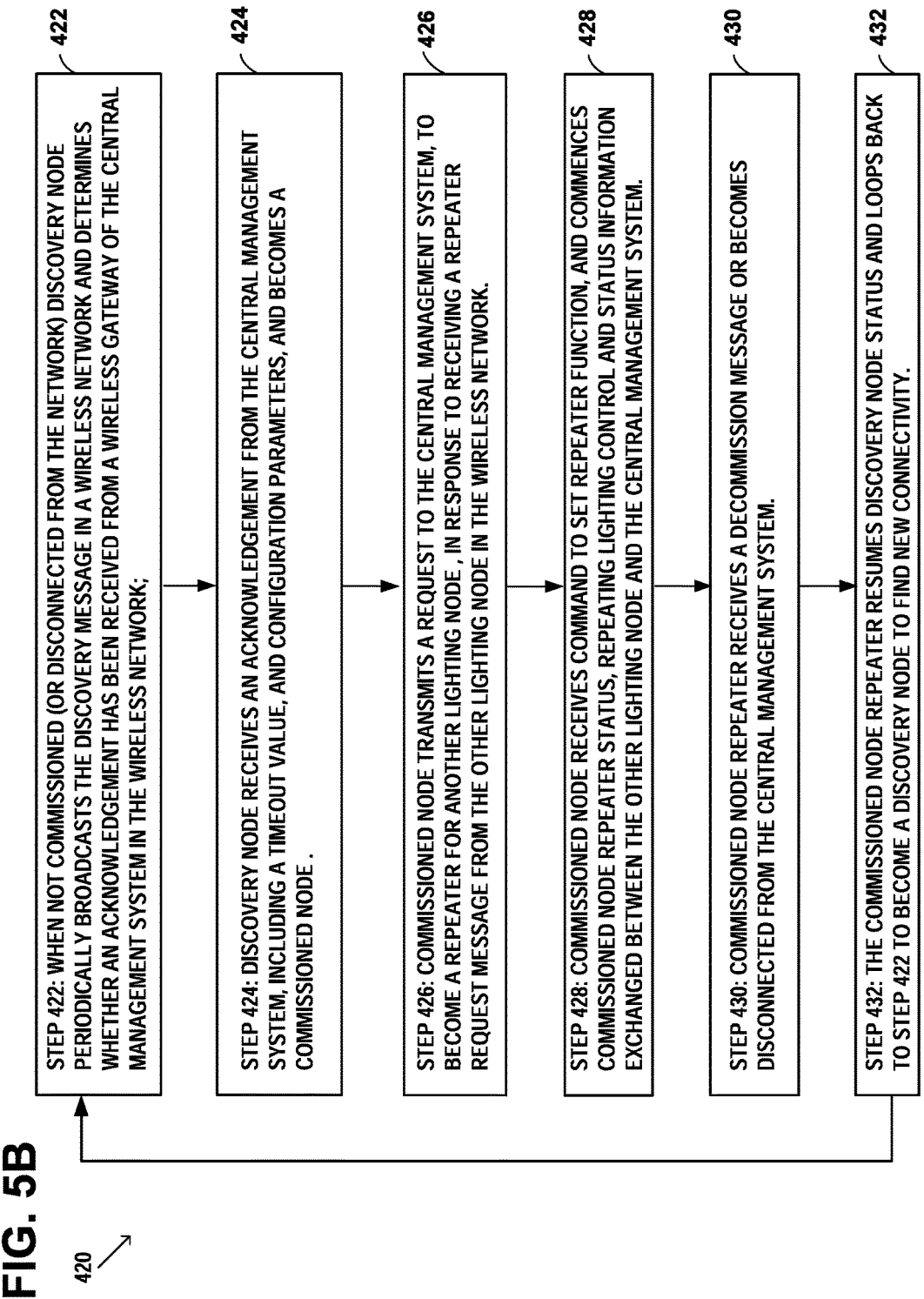

SYSTEM AND METHOD FOR BOTTOM-UP INVOCATION OF CONTROL SIGNAL REPEATERS IN A MESH LIGHTING NETWORK

FIELD OF THE INVENTION

The invention disclosed broadly relates to message flows during the organization of a distributed lighting network, and more particularly relates to a mesh lighting network that is dynamically organized into groups of lighting devices based on available and the most reliable connectivity with repeaters fanning out control signals to each group. Each lighting device is capable of becoming a repeater and forwarding control signals to additional lighting devices. During build-out of the mesh network, as new lighting devices are installed, when necessary, the control network automatically selects a device whose repeater function will provide the most reliable and efficient distribution of control signals to the new device or group of devices being installed.

BACKGROUND OF THE INVENTION

Lighting networks may be organized into groups of lighting nodes with repeaters used to enable control signals from a central controller to reach out-of-range lighting nodes or groups of lighting nodes. In theory, selecting lighting nodes to be repeaters should be done after all of the nodes are installed, the central controller is installed, and lighting nodes in range of the central controller are commissioned. However, in practice, the above almost never happens in the installation of lighting networks, with the result that there are too many repeaters turned on as a byproduct of installation activities. For example, installers will install a node or nodes around a campus, and then from the central controller, manually turn on repeaters the installer believes might help until one is found that allows communication with some or all of the recently installed nodes, to attempt to commission them. This is an expensive labor intensive and time consuming process. For various reasons (including being pressed for time) installers typically leave nodes in repeater mode, even if that repeater does not help in communication with the newly installed nodes. This creates an obvious excess of repeaters that create unnecessary message flows, increase resource usage and drive overall contention on the system.

What is needed is a better way to select repeaters during installation of nodes in a lighting network; more efficiently and automatically as part of a more cost-effective process for organizing and controlling modern networked lighting.

SUMMARY OF THE INVENTION

Example embodiments of the invention organize and control a distributed lighting network. A mesh lighting network is self-organized via repeaters into groups of lighting devices with repeaters fanning out control signals to each group. Each lighting device, in repeater mode, is capable of forwarding control signals to additional lighting devices. During build-out of the mesh network, as new lighting devices are installed, the control network automatically selects a device whose repeater function will provide the most efficient or reliable distribution of control signals to the new device or new group of devices being installed. As part of the build out the self-organization process limits the rate that new repeaters are created based on network activity. This ensures that network paths for control and management within range of any existing repeater will be satisfied before creating new repeaters. Embodiments of the invention allow a more efficient mesh structure to control the lighting network guided by metrics, such as link quality, link capacity, geographic proximity, node groupings, node processing utilization limits, node response latency and node storage limits. In accordance with embodiments of the invention, the desired grouping of lights specified in a lighting plan may also be used to decide which repeater enables a path for downstream lighting node connectivity.

Example embodiments of the invention may be characterized as a distributed bottom up approach to network formation, because each new node, when initially attempting contact with a lighting network, may request assistance from nearby nodes in that lighting network, which are within range. If one or more nodes from the lighting network respond to the new node, then the new node may request that one of the responding nodes become a repeater. In this manner, the new node may use the repeater function to enable communication with the management system and be commissioned onto the network. If multiple nodes request becoming a repeater for a new lighting node, then additional metrics may be evaluated in the decision to enable a repeater. This may be contrasted with a top down approach, where repeaters are enabled manually by expensive, specialized technicians using centralized control.

In accordance with an example embodiment of the invention, a system for organizing lighting nodes in a lighting network includes a central management system coupled to a wireless network, the central management system is configured to organize and control a large number of lighting nodes. At least one lighting node in the wireless network, is configured to receive a discovery message from another lighting node in the wireless network, and in response thereto, to transmit to the central management system, a request message including information from the discovery message and a request to invoke a repeater function in the at least one lighting node, for forwarding messages from the other lighting node to the central management system. The central management system is configured to receive the request message from the at least one lighting node, to validate the information from the discovery message of the other lighting node, to determine a best path for communication of messages between the other lighting node and the central management system based on the information from the discovery message, and to cause a command to be transmitted to the at least one lighting node to invoke the repeater function in the at least one lighting node.

A repeater approval timer in the central management system, is configured to prevent other lighting nodes in the wireless network, from respectively invoking a repeater function in the respective other lighting nodes during a delay interval that the central management system starts when the command is transmitted to the at least one lighting node to invoke the repeater function in the at least one lighting node. This ensures that all discovery messages that meet the validation criteria, will have time to be received and processed by the central management system.

The repeater approval timer in the central management system starts the delay interval each time a command is transmitted to another lighting node to invoke the repeater function in the another lighting node, thereby automatically preventing an excessive number of repeaters being created in the wireless network.

In accordance with an example embodiment of the invention, the central management system is further configured to receive two or more request messages from two or more lighting nodes, the two or more request messages requesting invoking a respective repeater function in the two or more lighting nodes, the two or more request messages derived from two or more respective discovery messages from the same other lighting node. The central management system is configured to validate information from the two or more discovery messages, the information having been included in respective one of the two or more request messages, to select one of the two or more lighting nodes based on the validation, and to cause a command to be transmitted to the selected lighting node to invoke the repeater function in the selected lighting node.

The repeater approval timer in the central management system, is configured to prevent other lighting nodes in the network, from respectively invoking a repeater function in other lighting nodes during a delay interval that the central management system starts when the command is transmitted to the selected lighting node to invoke the repeater function in the selected lighting node.

When a new repeater is created with a better link quality indication and greater spare node capacity, than an existing repeater, the central management system may re-balance repeater traffic. When re-balancing is necessary, this is done by sending a command to the existing repeater to turn off its repeater function, since network traffic from a discovery node through the new repeater, has a better link quality indication connection to the central management system or allows for better load distribution over the lighting network.

In accordance with an example embodiment of the invention, a lighting node in the lighting network, includes a message encoder that is configured to encode a discovery message, a repeater request message, or a request to a central management system to become a repeater. A communications unit in the lighting node, coupled to the encoder, is configured to periodically broadcast the discovery message in a wired or wireless network and to determine whether an acknowledgement has been received from one or more gateways of the central management system in the network. If no acknowledgement has been received, indicating the one or more gateways is out of range, then the communications unit is configured to broadcast a repeater request message to any nearby commissioned node in the network, to cause any receiving commissioned node to send a request to the central management system to become a repeater for the lighting node.

The lighting node communications unit is further configured to transmit the request to the wired or wireless one or more gateways of the central management system, to become a repeater for another lighting node in the network, in response to receiving a repeater request message from the other lighting node in the network.

DESCRIPTION OF THE FIGURES

FIG. 2C illustrates an example sequence diagram of discovery node N4 wirelessly transmitting respective discovery messages to two gateways GW1 and GW2 connected to the central management system. The discovery node N4 is within radio range of the two gateways GW1 and GW2.

FIG. 3A illustrates an example sequence diagram of a discovery lighting node N5 attempting to wirelessly broadcast a discovery message to the wireless gateway GW1, however, the discovery node N5 is beyond radio range of the gateway GW1. The discovery node N5 then broadcasts a repeater request message that is received by a nearby commissioned node N2.

FIG. 3B illustrates an example sequence diagram of the discovery lighting node N5 after it has been informed by the CMS in FIG. 3A, of the best path through the commissioned node repeater N2 for communications with the gateway GW1 and the central management system (CMS).

FIG. 5B is an example flow diagram of steps performed by the lighting node in consecutive stages of the network building process.

DISCUSSION OF THE PREFERRED EMBODIMENTS

Example embodiments of the invention organize and control a distributed lighting network. A process allows the efficient organization and control of large lighting networks of intelligent lighting nodes. In accordance with the invention, each lighting device is capable of forwarding control signals to additional lighting devices. During build-out of the mesh network, as new lighting devices are installed, the control network automatically selects a device whose repeater function will provide the most efficient or reliable distribution of control signals to a new individual or new group of devices being installed.

Efficient distribution of control signals may be accomplished by choosing a repeater based on, for example, the lowest node processor utilization, the lowest node storage usage, the best path wireless link speeds or available wireless capacity, adherence to an intended network design or lighting plan, proximity grouping of devices, services grouping of devices (parks, trails, streets, bridges, parking lots etc.), or functional grouping of devices (associated with motion detectors or cameras).

Figure 1:
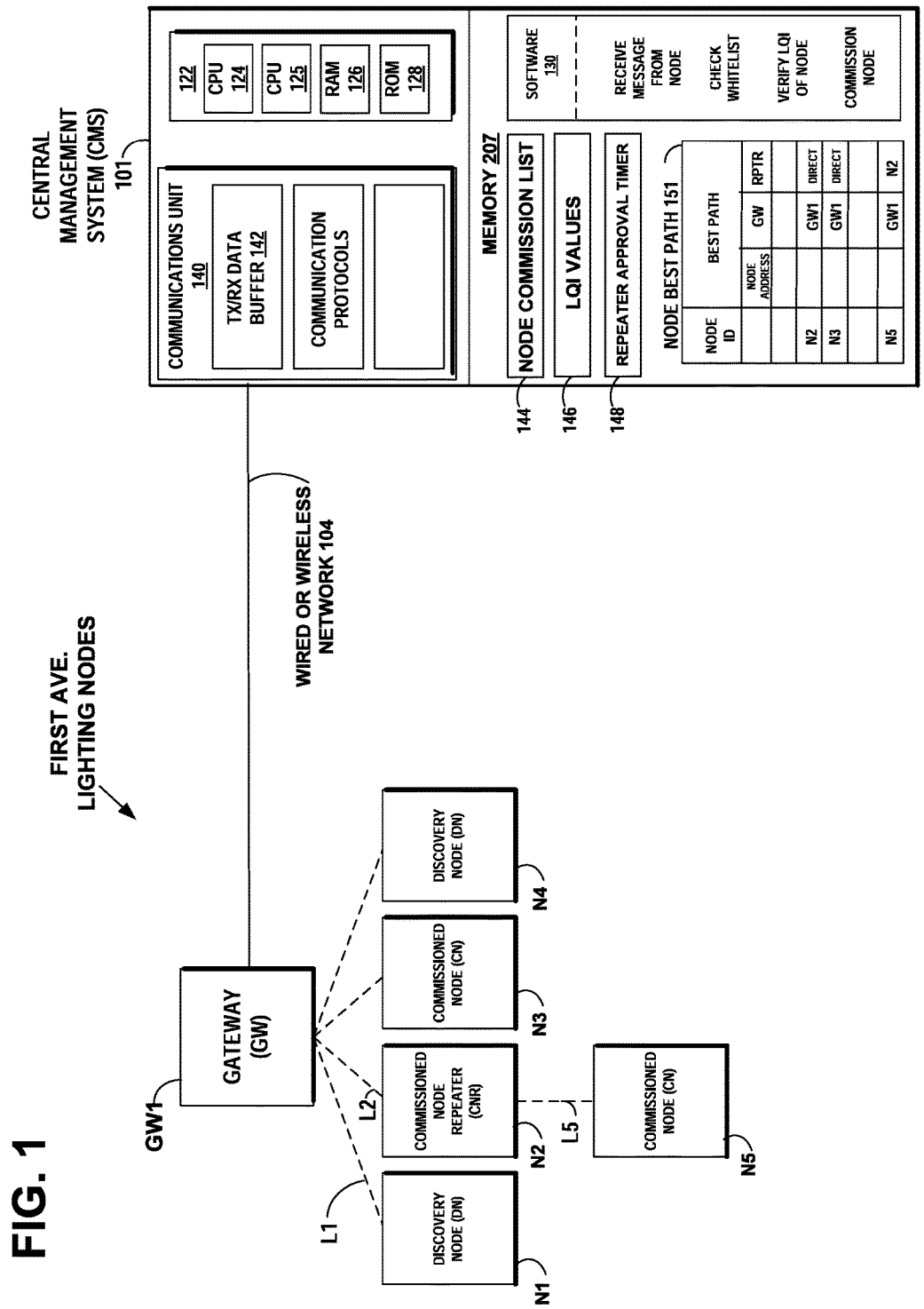
FIG. 1 illustrates an example network diagram of the central management system (CMS) connected over a wired or wireless connection to a gateway (GW) that wired or wirelessly communicates with a plurality of lighting nodes in a network.

FIG. 1 illustrates an example network diagram of the central management system (CMS) connected over a wired or wireless connection to a gateway (GW) that wirelessly communicates with a plurality of lighting nodes in a wireless network.

There may be a plurality of lighting node devices in the distributed lighting network 104. Lighting node devices N1, N2, N3, N4, N5, are in a branch along First Ave. Other branches, not shown, could light up parks, bridges, bike and hiking trails, parking lots, etc. Each lighting device includes an LED lighting array and digital components shown in FIG. 4.

The central management system 101 includes a processor 122 comprising a dual central processor unit (CPU) or multi-CPU 124/125, a random access memory (RAM) 126 and read only memory (ROM) 128. The memories 126 and/or 128 include computer program code, including control software 130. The memory 207 in the central management system 101 includes a node best path list 151. The memory 207 in the central management system 101 includes a node commission list 144, a set of link quality indication (LQI) threshold values 146 or contains other efficiency and reliability metrics, and a repeater approval timer (RAT) 148. The central management system 101 includes a wired or wireless communications unit 140 that includes a transmit/receive (TX/RX) buffer 142, which is configured to communicate via gateway GW1 with the lighting node devices via the network 104. The communications unit 140 includes IEEE 802.xx and other communication protocols depending the connectivity requirements between the CMS (101) and the gateway (GW1). Other examples of the network 104, include twisted pair, coax cable, Ethernet, Infrared, RFID, WiFi, Bluetooth, Bluetooth Low Energy, ultra-narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network. The central management system 101 may include a radio communications unit 140 that includes a transmit/receive (TX/RX) buffer 142 and optionally a cell phone transceiver and a WiFi transceiver to communicate with the lighting node devices 104 via radio communications units in the devices.

The central management system (CMS) 101 includes program software 130 in the memory 207, to receive a discovery message broadcast by a lighting node. The program software 130 verifies the link quality indication (LQI) or in other embodiments, other efficiency and reliability metrics, and checks whether the message indicates that the node's ID is on a white list. The program software 130 may optionally check whether the message indicates the correct model and manufacturer for the node. The program software 130 then commissions the lighting node and determines the best path between the lighting node and the gateway GW1.

In one example embodiment, a node addressing scheme may be used by the CMS 101 to commission discovery nodes and to control and communicate with commissioned nodes and commissioned node repeaters. An example addressing scheme for the lighting nodes may include an address with fields for a customer ID, site ID, network ID, lighting group ID, which may indicate services grouping (parks, trails, streets, bridges, parking lots etc.) or functional grouping (motion detectors or cameras associated with the lighting node), device node ID, nearest street address, GPS location and device type, which may indicate device's processor size and storage size. Either an installer or operation of a pre-existing lighting plan will have stored into the memory of a newly installed lighting node, one or more of the values for customer ID, site ID, network ID, lighting group ID, device node ID, nearest street address, GPS location, device type, processor size and storage size. When a discovery node broadcasts a discovery message, including its stored the address, which is received by the gateway GW1 and CMS, the CMS stores the address in the node best path table 151. Every commissioned node served by the CMS, has its address stored in the node best path table 151, along with the address or identity of the gateway and any repeater through which the node communicates with the CMS.

Link Quality Indication (LQI) is a characterization of the strength and/or quality of a received frame, which is typically represented by an integer scale ranging from zero to 255, with at least eight unique values. The reason for a low LQI value can be twofold: a low signal strength and/or high signal distortions that reduce the accuracy expectations of a received frame, for example by interference due to weather conditions and/or multipath propagation impacts. Low LQI value could trigger a request for frame retransmission. High LQI values, however, are typically designed to indicate a sufficient signal strength and low signal distortions in a received frame. In this case the expectations are that the frame contains accurate data. Typically the LQI value is almost always high, for example 255, for scenarios with very low signal distortions and a signal strength much greater than a defined sensitivity level. In this case, the packet error rate tends towards zero and an increase of the signal strength, i.e. by increasing the transmission power, cannot decrease the error rate any further.

Received signal strength indication (RSSI) or energy detection (ED) may be used to evaluate the signal strength and also employed to determine if link performance is acceptable. The received signal power, as indicated by received signal strength indication (RSSI) value or energy detection (ED) value, may not, by itself, characterize the signal quality and the ability to decode a signal. They are two of a number of measured or defined metrics that may be used to decide if a link is suitable for reliable data transmission.

LQI and RSSI/ED may be applied together, depending on the optimization criteria. If a low frame error rate (corresponding to a high throughput) is the optimization criterion, then the LQI value may be taken into consideration. If, however, the target is a low transmission power, then the RSSI/ED value is also helpful. Various combinations of LQI and RSSI/ED are possible for routing decisions. As a rule of thumb, information on RSSI/ED is useful in order to differentiate between links with high LQI values. However, transmission links with low LQI values may be discarded for routing decisions, even if the RSSI/ED values are high, since RSSI/ED is merely information about the received signal strength, whereas the source of the signal strength may be an interferer.

Figure 2A:
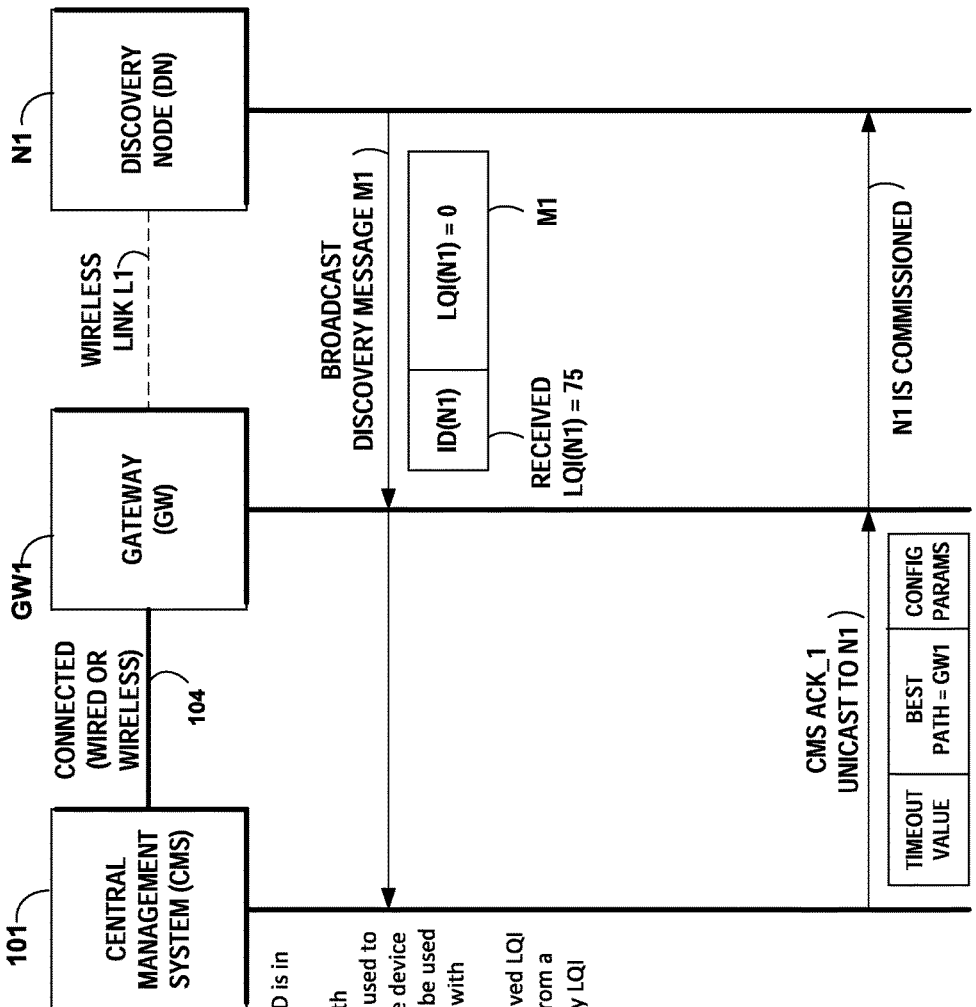
FIG. 2A illustrates an example sequence diagram of a discovery lighting node N1 wirelessly broadcasting a discovery message to the wireless gateway GW1 connected to the central management system. The discovery node N1 is within radio range of the gateway GW1.

FIG. 2A illustrates an example sequence diagram of a discovery lighting node N1 wirelessly broadcasting a discovery message M1 to the wireless gateway GW1 connected to the central management system 101. The discovery node N1 is within radio range of the gateway GW1. The central management system verifies that the identity of the discovery node is in a whitelist, chooses the best path via a gateway, in this case GW1, which will be used to communicate with the discovery node, logs the network ID to be used when communicating with the discovery node, and verifies that the received link quality indication (LQI) of the received message is greater than a threshold discovery LQI. In other embodiments, other metrics may be used to guide the selection of the appropriate repeater. The figure shows the central management system (CMS) transmitting an acknowledgement message ACK_1 via the gateway GW1, to the discovery node N1, and commissioning the node N1. In embodiments of the invention, in addition to the received link quality indication (LQI) being greater than a threshold value, the CMS may verify that the arrival time or propagation delay of the received message is less than a threshold value or consider the application of other efficiency metrics. Either or both the link quality indication and the propagation delay information from the discovery message may be used to determine the best path for maximizing reliability or speed of communication between the other lighting node and the central management system.

Figure 2B:
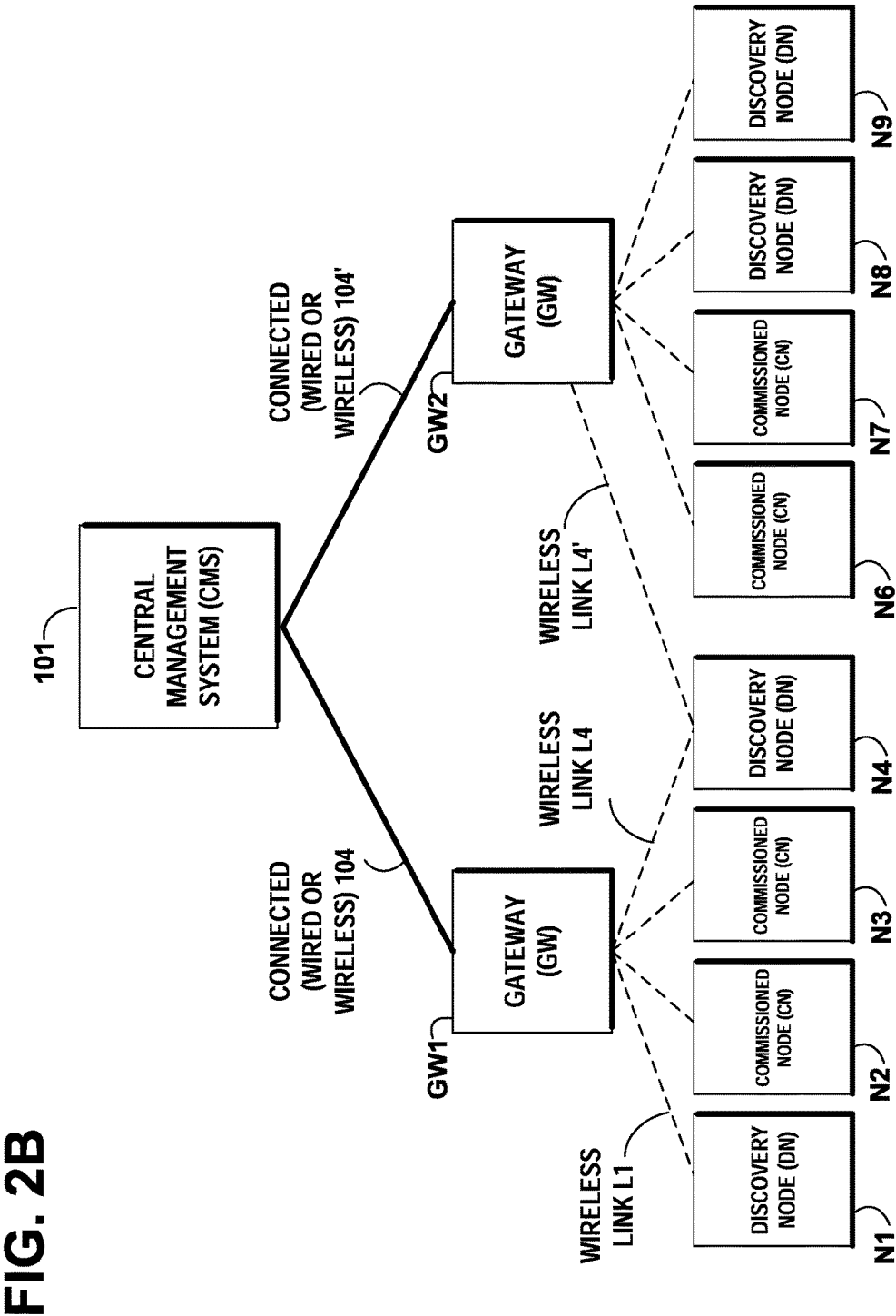
FIG. 2B illustrates an example network diagram of the central management system (CMS) connected via two gateways to a wireless network that includes both discovery nodes and commissioned nodes. The discovery lighting node N1 is shown wirelessly transmitting to the wireless gateway GW1. A discovery node N4 is shown wirelessly transmitting to two gateways GW1 and GW2, as described in FIG. 2C.

FIG. 2B illustrates an example network diagram of the central management system (CMS) connected via two gateways, to a wireless network that includes both discovery nodes and commissioned nodes. The discovery lighting node N1 is shown wirelessly transmitting over wireless link L1 to the gateway GW1. A discovery node N4 is shown wirelessly transmitting over wireless links L4 and L4' to two gateways GW1 and GW2, as described in FIG. 2C.

FIG. 2C illustrates an example sequence diagram of discovery node N4 wirelessly broadcasting a discovery message M4 that is heard by two gateways GW1 and GW2 connected to the central management system 101. The discovery node N4 is within radio range of the two gateways GW1 and GW2. Optionally, the node N4 may send separate discovery messages, M4 to GW1 and M4' to GW2. The central management system selects and logs the network ID path of the discovery messages M4 and M4' having the highest receive LQI (as seen at the respective GW1 and GW2) that is greater than or equal to threshold Discovery LQI, commissions node N4, and sends an acknowledgement ACK_1 to the discovery node N4. In embodiments of the invention, in addition to the received link quality indication (LQI) being greater than a threshold value, the CMS may verify that the arrival time or propagation delay of the received message is less than a threshold value or apply other efficiency metrics. In this example, either or both the link quality indication and the propagation delay information from the discovery message may be used to determine the best path for maximizing reliability or speed of communication between the other lighting node and the central management system.

FIG. 3A illustrates an example sequence diagram of a discovery lighting node N5 attempting to wirelessly broadcast a discovery message M5 to the wireless gateway GW1, however, the discovery node N5 is beyond radio range of the gateway GW1. The discovery node N5 then broadcasts a repeater request message M5' that is received by a nearby commissioned node N2, which replies with an acknowledgement ACK. It is possible that other commissioned nodes may also respond with acknowledgements. The discovery node N5 then transmits a unicast request message M5" to the nearby commissioned node N2. In response, the commissioned node N2 transmits a request N2' to the central management system (CMS) to become a repeater for the discovery node N5. The central management system (CMS) verifies that the discovery node N5's ID is in the whitelist, processes the request for discovery node N5 to determine the most efficient or reliable path (network) to use and log this best path, verifies that the repeater approval timer (RAT) 148 has expired, and sends an "operating parameter" command with "Repeater=True", back to the selected commissioned node N2, commanding it to become a repeater (CNR). The central management system (CMS) then resets the RAT timer 148.

The CMS Repeater Approval Timer (RAT) 148 is triggered whenever the CMS 101 sends the command to a commissioned node (CN) to become a commissioned node repeater (CNR), to halt the creation of repeaters for some time period (typically 5 minutes). This ensures that all discovery messages that meet some efficiency or reliability criteria (in whitelist and ≥Discovery LQI) will have time to be received by the CMS and be added to the commissioning queue, whether they are in range of the gateway or are forwarded via other repeaters. The RAT timer also resets whenever a discovery message is received.

The repeater approval timer in the central management system starts the delay interval each time a command is transmitted to another lighting node to invoke the repeater function in the another lighting node, thereby automatically preventing an excessive number of repeaters being created in the wireless network.

FIG. 3B illustrates an example sequence diagram of the discovery lighting node N5 after it has been informed in the ACK_1 message by the CMS in FIG. 3A, of the best path through the commissioned node repeater N2 for communications with the gateway GW1 and the central management system (CMS). The figure shows the discovery node N5 transmitting a discovery message M5 to the commissioned node repeater N2 for forwarding to the gateway GW1 and the central management system (CMS). The repeated discovery message N2" includes the received LQI or some other efficiency metric related to the discovery message as it was received by the repeater N2. The CMS 101 processes the single discovery message received via the repeater, sends an ACK_1, if the received LQI, within the message payload of this example, is greater than or equal to the threshold Discovery LQI. The CMS then adds the node N5 to the commissioning Queue and logs it in the device table. The Repeater Approval Timer (RAT) 148 is reset.

Figure 3C:
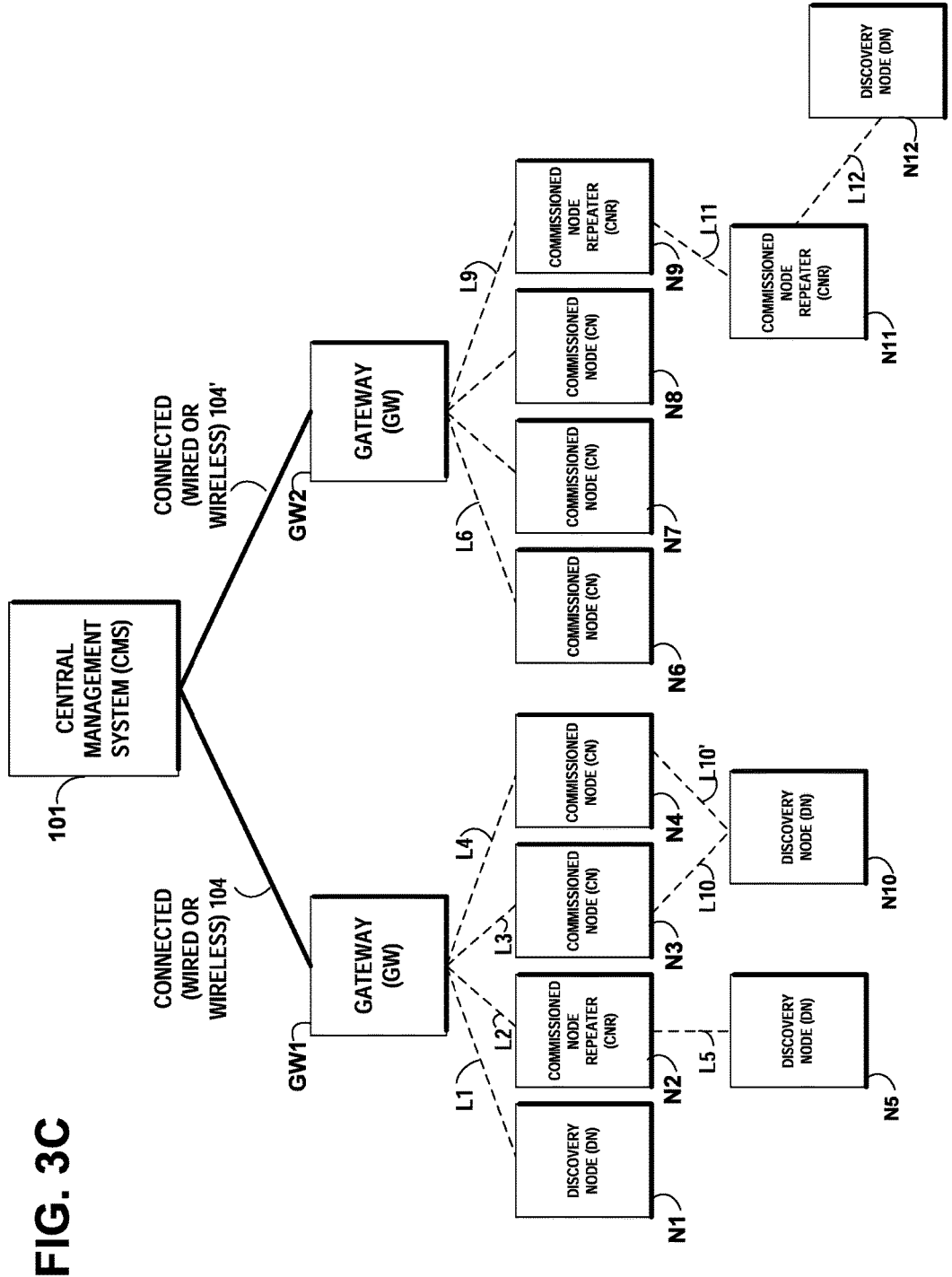
FIG. 3C illustrates an example network diagram of the central management system (CMS) connected via two gateways to a wireless network that includes both discovery nodes and commissioned nodes. The discovery lighting node N1 is shown wirelessly transmitting to the wireless gateway GW1. The discovery node N10 is shown wirelessly transmitting to two commissioned nodes N3 and N4, sending repeater requests to both, as described in FIG. 3D.

FIG. 3C illustrates an example network diagram of the central management system (CMS) connected via links 104 and 104' to two gateways GW1 and GW2, which connect to a wireless network that includes both discovery nodes and commissioned nodes. The discovery lighting node N1 is shown wirelessly transmitting to the wireless gateway GW1. The discovery node N10 is shown wirelessly transmitting over wireless links L10 and L10' to two commissioned nodes N3 and N4, broadcasting a repeater request to both, as described in FIG. 3D.

Figure 3D:
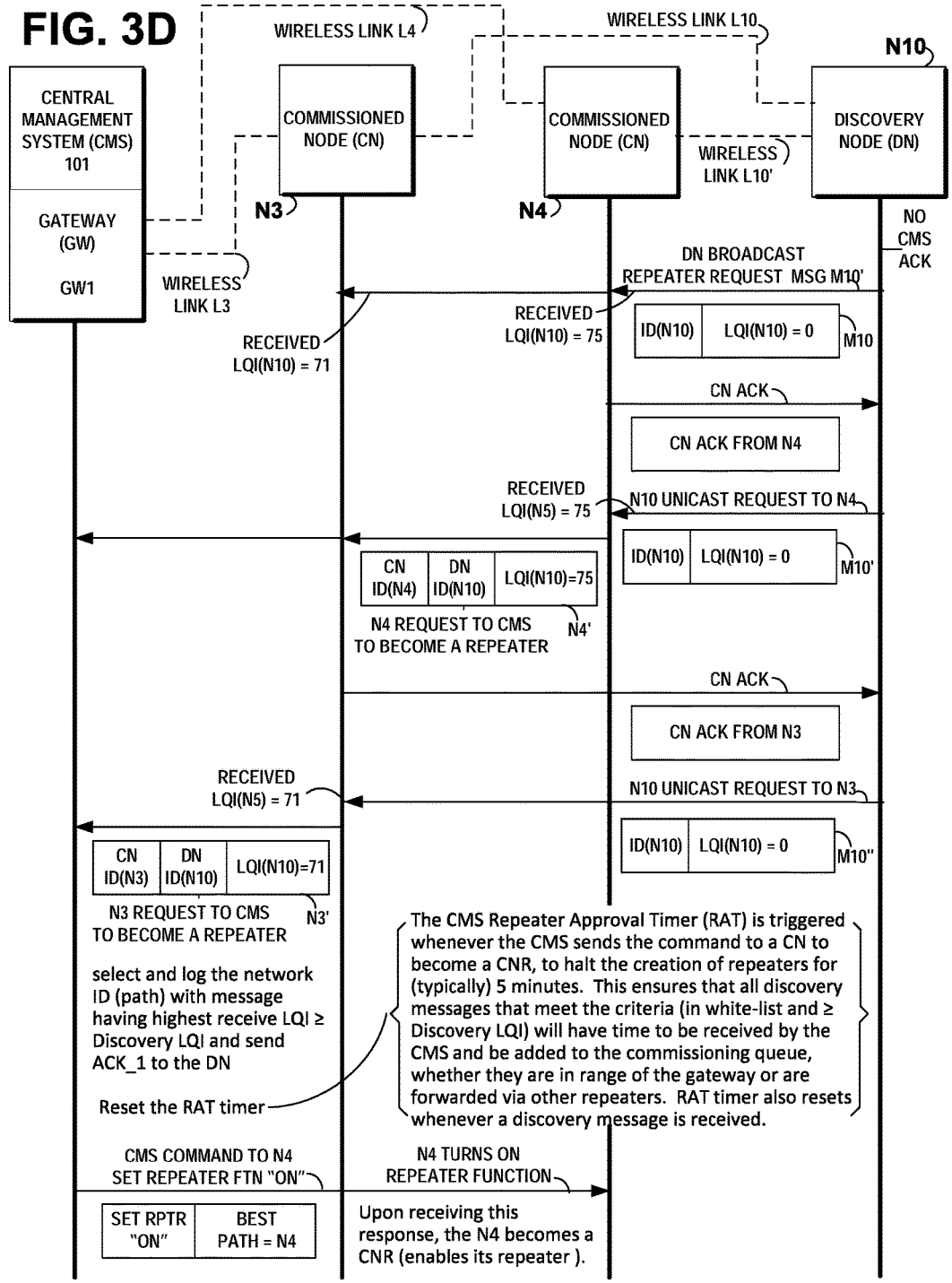
FIG. 3D illustrates an example sequence diagram of the discovery lighting node N10, wirelessly broadcasting to two commissioned nodes N3 and N4, a repeater request. The discovery node N10 is beyond radio range of the gateway GW1.

FIG. 3D illustrates an example sequence diagram of the discovery lighting node N10, wirelessly broadcasting a repeater request message M10 to two commissioned nodes N3 and N4. The discovery node N10 is beyond radio range of the gateway GW1. Both of the nearby commissioned nodes N3 and N4, reply with acknowledgement ACKs. In this particular example the repeater decision is based on the Link quality indication (LQI) as a reliability metric. The discovery node N10 then transmits a first unicast request message M10' to the commissioned node N4, which is received with an LQI=75. The discovery node N10 then transmits a second unicast request message M10" to commissioned node N3, which is received with an LQI=71. In response, the commissioned node N4 transmits a first request N4' (with a payload of LQI=75) to the central management system (CMS) to become a repeater for the discovery node N10. Also, in response, the commissioned node N3 transmits a second request N3' (with a payload of LQI=71) to the central management system (CMS) to become a repeater for the discovery node N10.

The CMS selects and logs the network ID (best path) for either the first node N3 or the second node N4 whose request to become a repeater includes the highest receive LQI≥threshold Discovery LQI for the discovery message received from the node N10. In this example, commissioned node N4 is the most reliable path and is commanded to turn on its repeater function, since the first unicast request message M10' was received at the commissioned node N4 with the greater LQI=75. The CMS sends ACK_1 to the discover node N10, through the best path repeater N4, to commission node N10. In embodiments of the invention, in addition to the received link quality indication (LQI) being greater than a threshold value, the CMS may verify that the arrival time or propagation delay of the received message is less than a threshold value or use other efficiency metrics in its path choice. In this example either or both the link quality indication and the propagation delay information from the discovery message may be used to determine the best path for maximizing reliability or speed of communication between the other lighting node and the central management system.

The CMS Repeater Approval Timer (RAT) 148 is triggered whenever the CMS sends the command to a commissioned node (CN) to become a commissioned node repeater (CNR), to halt the creation of repeaters for some period of time (typically 5 minutes). This ensures that all discovery messages that meet some efficiency or reliability criteria (in whitelist and ≥Discovery LQI) will have time to be received by the CMS and be added to the commissioning queue, whether they are in range of the gateway or are forwarded via other repeaters.

In example embodiments of the invention, the best path for maximizing reliability or speed of communication between the N10 lighting node and the central management system CMS, may be based on other metrics than the received link quality indication (LQI) of the discovery message M10. Example alternate metrics may include propagation delay of the discovery message M10, respective service group ID of the two or more lighting nodes N3 and N4, respective functional group ID of the two or more lighting nodes N3 and N4, respective processor size of the two or more lighting nodes N3 and N4, and respective storage size of the two or more lighting nodes N3 and N4.

Another metric may be the relative priority of network traffic of the lighting group of which the N10 lighting node is a member. For example, whichever node N3 or N4 that has the larger processor, larger amount of storage, or better connections, would be selected by the CMS to handle the most important traffic having the highest relative priority, such as safety and security traffic from nodes associated with security cameras or motion detectors. If the lighting node N10 is a member of a services group with security cameras, for example, then lighting node N10 may have traffic that is more important and is a higher relative priority than traffic from another grouping of simple street lights. Accordingly, the repeater selection criterion used by the CMS to support prioritized load balancing, gives the node N10 associated with cameras, for example, the faster path through the more powerful repeater N3 or N4, for a more efficient communication path from N10 to the CMS, thereby maximizing reliability or speed of communication between the lighting node N10 and the CMS.

In embodiments of the invention, lighting networks may be designed as a plurality of partitioned lighting groups, where a group identified by a group ID may be composed of lighting nodes performing a specific function and producing network traffic having a relatively high priority. The associated repeaters in the group will only support nodes in the group having that specific function, as identified by the group ID. An example is lighting nodes having camera connections or motion detector triggers, which produce network traffic having a relatively high priority. In such cases, network traffic of a given relative priority may be directed to specific repeaters using the group ID and, when necessary, nodes of this group may be activated as repeaters to only provide connectivity to specifically dedicated groups of nodes having the same group ID, such as lights in a park or highway lights. Similarly, lighting on a bridge may utilize only repeaters dedicated for that purpose. This provides a significant advantage. For example, when activating repeaters for bridge lights or re-balancing bridge lighting, repeater creation and re-balancing activity can remain unaffected in other non-bridge lighting node groupings.

In embodiments of the invention, the CMS may employ multiple RATs and use them to assign different delay values for the Repeater Approval Timer (RAT) 148 to the different lighting groups, where speed is important either for initial group build-out, re-balancing of traffic flows, or recovery from an outage. This has the advantage that waits for the RAT to expire may be localized within lighting groups and not network wide. The rate of formation of new repeaters in a lighting group depends, in part, on the RAT 148 value assigned by the CMS to the group. To accelerate the initial creation of repeaters in a group, the CMS may dynamically change RAT values and assign a short duration RAT delay value when the rollout of the lighting group is started. Then, after a relatively small number of repeaters have been created in the group, in order to limit overpopulation of the repeaters in the group, the CMS may assign a longer duration RAT delay value.

The repeater approval timer (RAT) provides at least one of variable delay intervals for invoking the repeater function in lighting nodes of at least one individual group of lighting nodes or different delay intervals for invoking the repeater function in lighting nodes of different ones of a plurality of groups of lighting nodes.

In this manner, multiple Repeater Approval Timers 148 may be created by the CMS, with each separate RAT 148 associated with a respective service group, functional group, a group of geographically co-located lighting nodes, or any grouping of lighting nodes specified in a lighting plan. Different RAT timers may also have different delay values assigned by the CMS, which may vary from long to short delays, to adjust how quickly or often new repeaters can be activated, thereby accommodating different relative priorities of network traffic handled by respective groups of repeaters.

Figure 4:
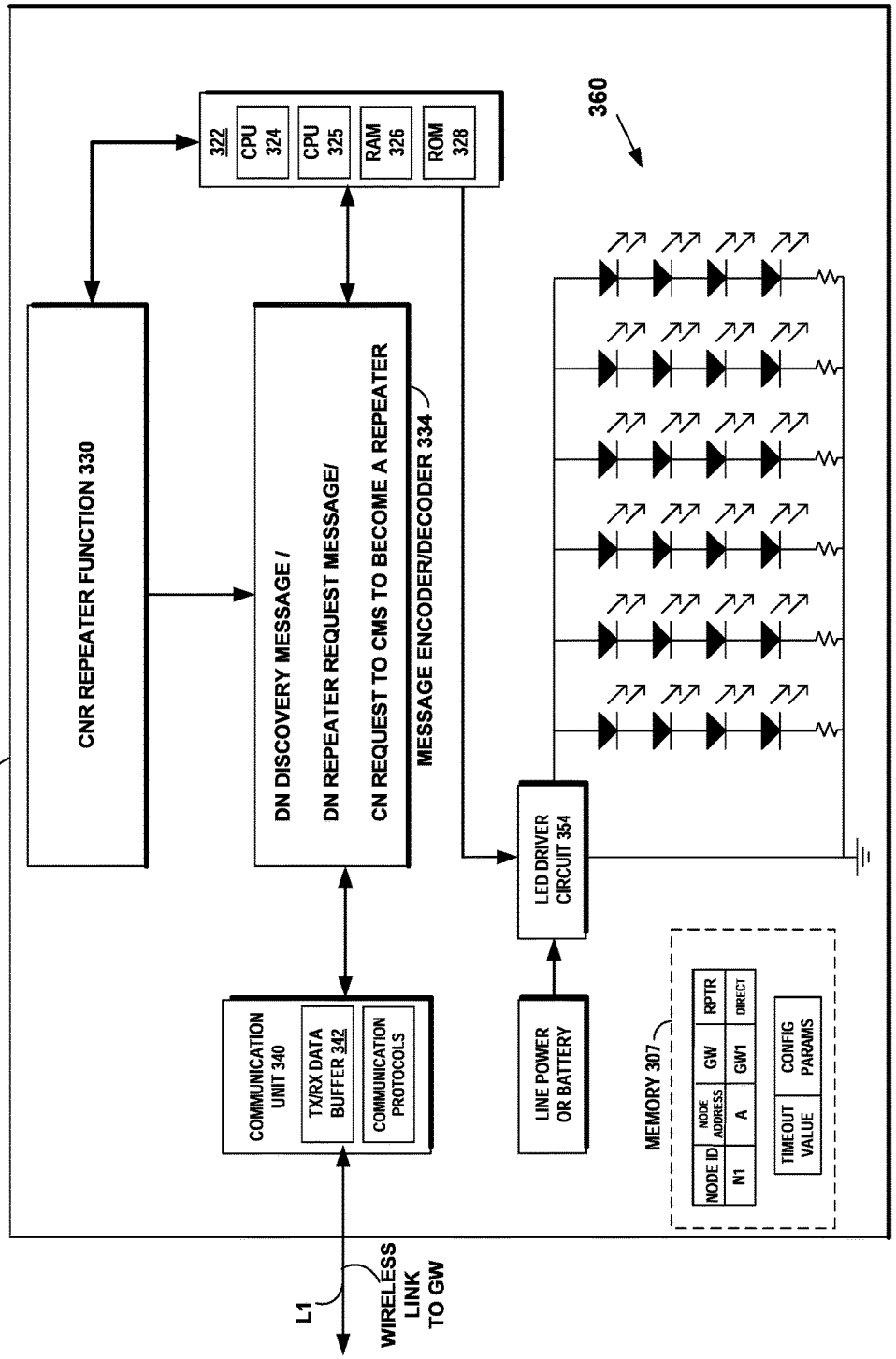
FIG. 4 is an example functional block diagram of the lighting device node N1, in accordance with an example embodiment of the invention.

FIG. 4 is an example functional block diagram of the lighting device node N1, in accordance with an embodiment of the invention, showing an example lighting device N1 connected to the wireless network 104. The lighting node device includes data such as node ID, address, gateway ID, and repeater status in its memory 307. The lighting node device includes a wireless communications unit 340 coupled to the encoder/decoder 334, which is configured to broadcast the discovery message in the wireless network 104. The network 104 includes the central management system 101 configured to receive the discovery message, commission the lighting node N1, and provide the timeout value, configuration parameters, and other information. Using LQI information as the criterion, then the best path is considered also the most reliable path. Other reliability or efficiency criteria may be considered for the best path or a combination of criteria.

The example lighting device N1 shown in FIG. 4, includes a wireless communications unit 340 that includes a transmit/receive (TX/RX) buffer 342, which is configured to communicate with the central management system 101 via the network 104. The communications unit 340 includes any needed communication protocol to communicate with a CMS 101 over the network L1. The device N1 activates the LED driver circuit 354 controlled by the processor 322, to power the LED light array 360 with either line power, battery power, or photovoltaic solar power. Depending on the control parameters in a lighting schedule, the light array 360 may be turned on, its illumination level adjusted, its color changed, or turned off, in response. The LED driver circuit 354 controls the voltage and current patterns sent to each LED element (Red, Green, Blue) in the LED array 360. The LED array 360 may be a single light fixture with a plurality of Red, Green and Blue LEDs contained in the light fixture, or it may be an array of LED's.

The example lighting device N1 includes a processor 322 comprising a dual central processor unit (CPU) or multi-CPU 324/325, a random access memory (RAM) 326 and read only memory (ROM) 328. The memories 326 and/or 328 include computer program code for responding to lighting control information messages 170 from the central management system 101.

Figure 5A:
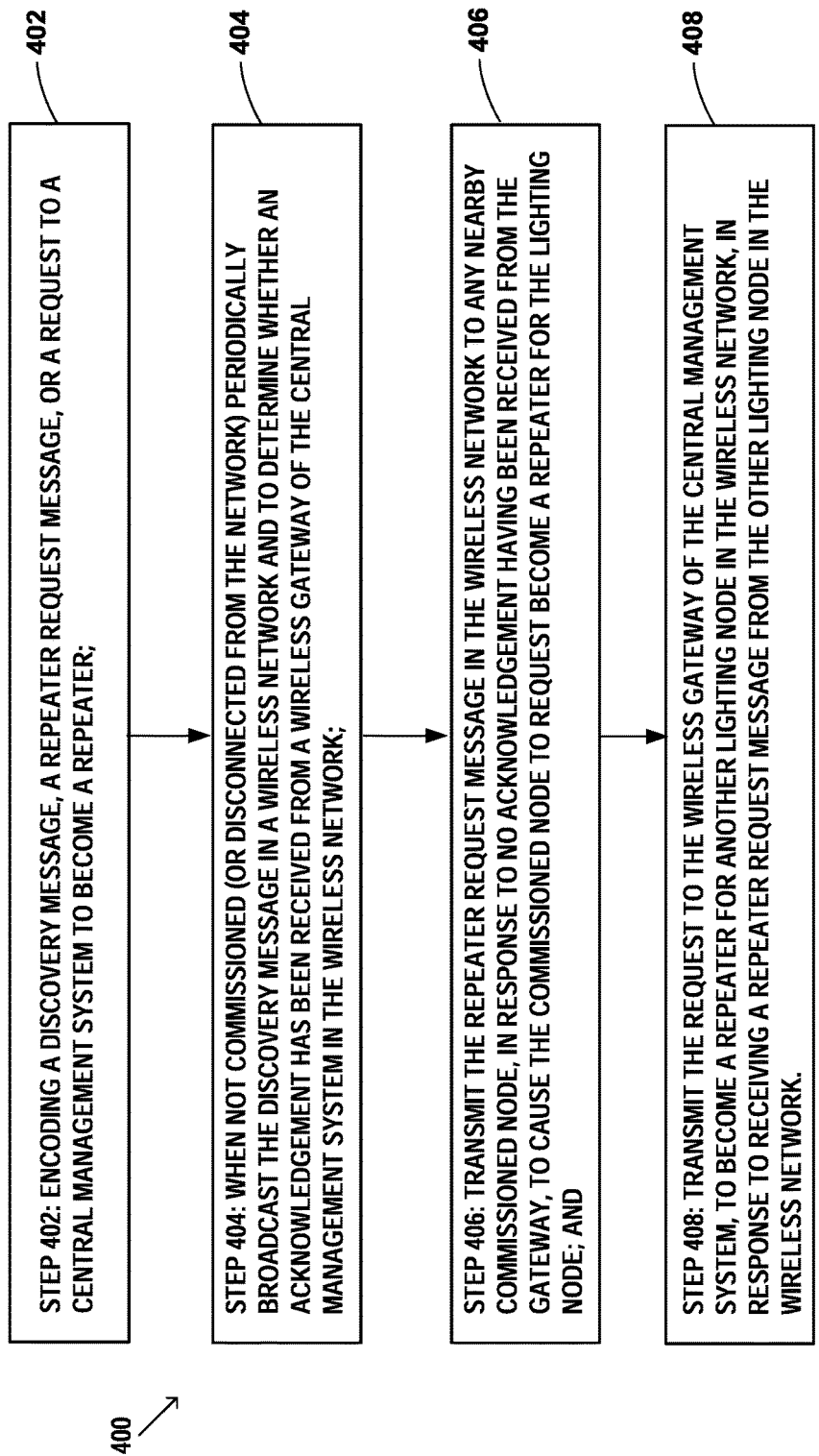
FIG. 5A is an example flow diagram of steps performed by the lighting node for encoding a message.

The following example steps in the flow diagram 400 of FIG. 5A, are performed by the lighting node for encoding a message represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: encoding a discovery message, a repeater request message, or a request to a central management system to become a repeater;

Step 404: when not commissioned (or disconnected from the network) periodically broadcast the discovery message in a wireless network and to determine whether an acknowledgement has been received from a wireless gateway of the central management system in the wireless network;

Step 406: transmit the repeater request message in the wireless network to any nearby commissioned node, in response to no acknowledgement having been received from the gateway, to cause the commissioned node to request becoming a repeater for the lighting node; and Step 408: transmit the request to the wireless gateway of the central management system, to become a repeater for another lighting node in the wireless network, in response to receiving a repeater request message from the other lighting node in the wireless network.

When a repeater node is deleted or decommissioned in the network, any disconnected node is considered new again and recycles through the initial network build process to find new connectivity.

The following example steps in the flow diagram 420 of FIG. 5B, are performed by the lighting node in consecutive stages of the network building process. The steps represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 422: When not commissioned (or disconnected from the network) the lighting node in a discovery node state periodically broadcasts the discovery message in a wireless network and determines whether an acknowledgement has been received from a wireless gateway of the central management system in the wireless network.

Step 424: The lighting node in a discovery node state receives an acknowledgement from the central management system, including a timeout value, and configuration parameters, the lighting node assuming a commissioned node state.

Step 426: The lighting node in the commissioned node state transmits a request to the central management system, to become a repeater for another lighting node, in response to receiving a repeater request message from the other lighting node in the wireless network.

Step 428: The lighting node in the commissioned node state receives command to set repeater function, and commences the commissioned node repeater state, repeating lighting control and status information exchanged between the other lighting node and the central management system.

Step 430: The lighting node in the commissioned node repeater state receives a decommission message or becomes disconnected from the central management system.

Step 432: The lighting node in the commissioned node repeater state resumes the discovery node state and loops back to step 422 to become a discovery node to find new connectivity.

Figure 5C:
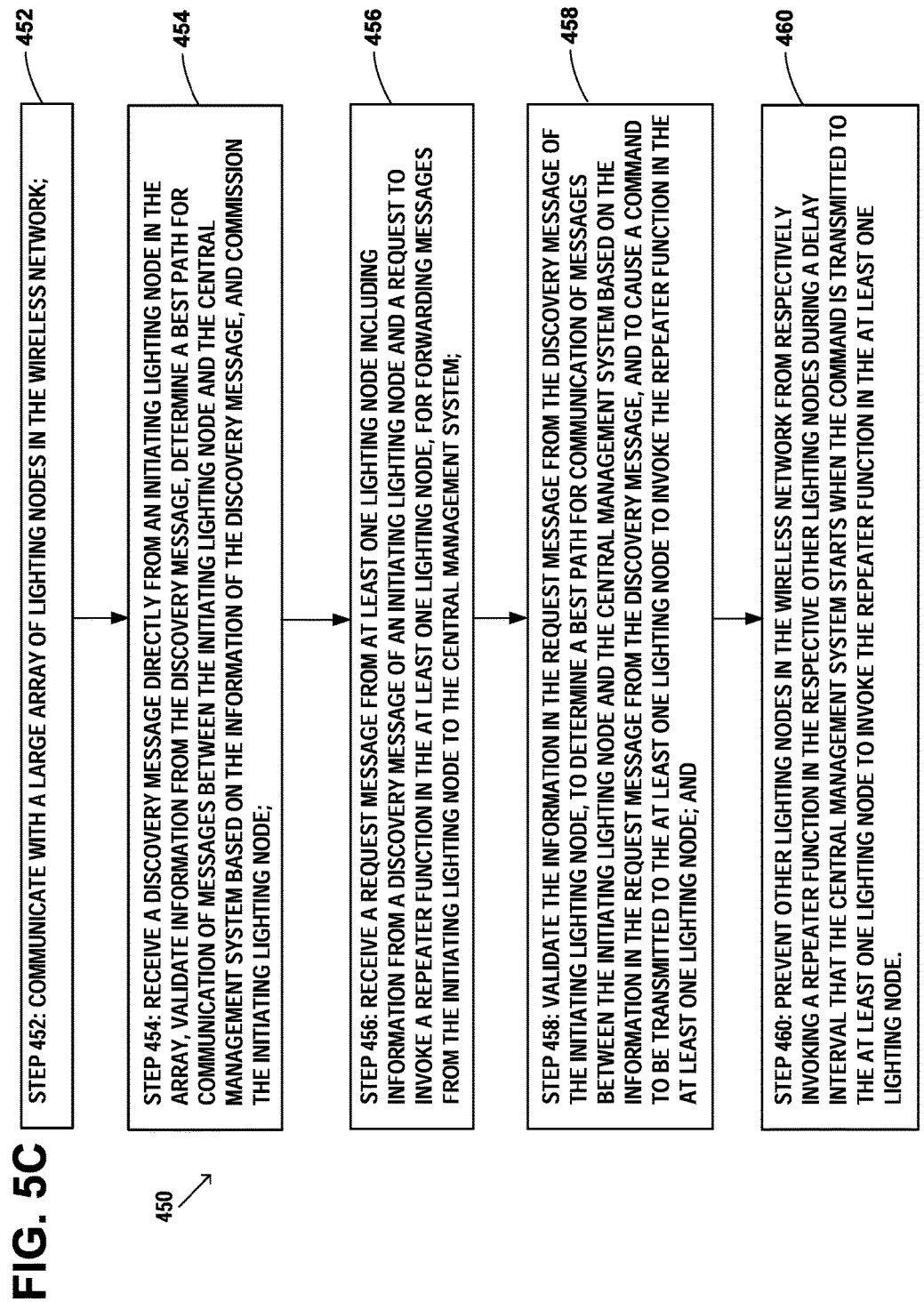
FIG. 5C is an example flow diagram of steps performed by the central management system (CMS).

The following example steps in the flow diagram 450 of FIG. 5C, are performed by the central management system (CMS) represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 452: communicate with a large array of lighting nodes in the wireless network;

Step 454: receive a discovery message directly from an initiating lighting node in the array, validate information from the discovery message, determine a best path (for example, the most efficient or reliable) for communication of messages between the initiating lighting node and the central management system based on the information of the discovery message, and commission the initiating lighting node;

Step 456: receive a request message from at least one lighting node including information from a discovery message of an initiating lighting node and a request to invoke a repeater function in the at least one lighting node, for forwarding messages from the initiating lighting node to the central management system;

Step 458: validate the information in the request message from the discovery message of the initiating lighting node, to determine a best path for communication of messages between the initiating lighting node and the central management system based on the information in the request message from the discovery message, and to cause a command to be transmitted to the at least one lighting node to invoke the repeater function in the at least one lighting node; and Step 460: prevent other lighting nodes in the wireless network from respectively invoking a repeater function in the respective other lighting nodes during a delay interval that the central management system starts when the command is transmitted to the at least one lighting node to invoke the repeater function in the at least one lighting node.

FIGS. 6A to 6D illustrate an example sequence showing the central management system (CMS) 101 rebalancing repeater traffic when a new repeater N4 is created with a better link quality indication of LQI=75, greater than an existing repeater N3 link quality indication of LQI=71.

Figure 6A:
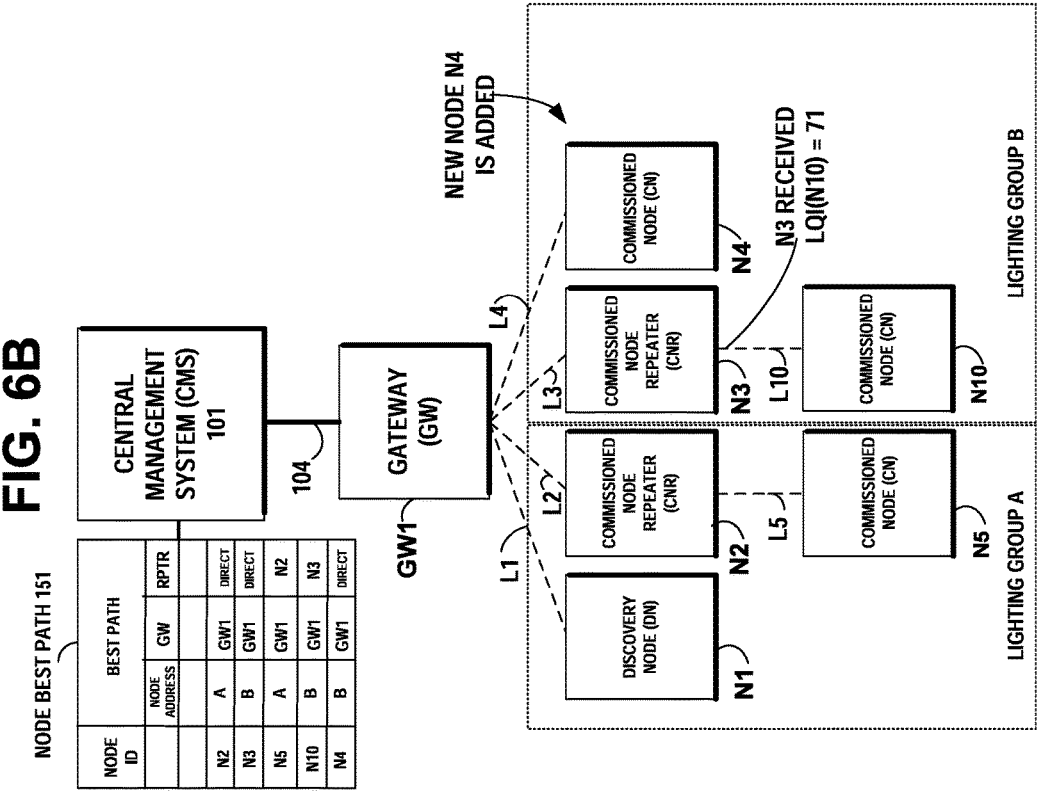
FIG. 6A shows an initial state for an example network of the CMS rebalancing repeater traffic for two lighting groups, A and B.

FIG. 6A shows an initial state for an example network of the CMS 101 and the gateway GW1 serving two lighting groups, A and B. Lighting group A includes discovery node N1, commissioned node N5 connected through commissioned repeater node N2 to GW1. Lighting group B includes commissioned node N10 connected through commissioned repeater node N3 to GW1. The receive LQI for the messages received at commissioned repeater node N3 over link L10 from the commissioned node N10 is LQI=71. The node best path table 151 in the CMS 101 stores the current path information for the nodes in the network, including node ID, gateway ID, direct or repeater connection status, and lighting group ID.

Figure 6B:
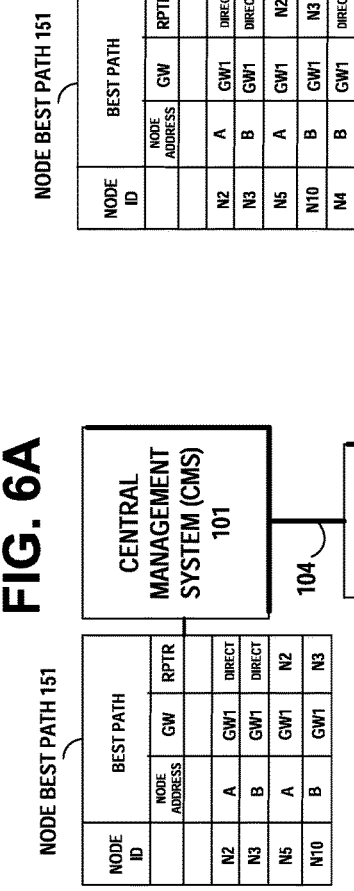
FIG. 6B shows a next state for the example network of FIG. 6A, wherein a new node N4 is added in lighting group B, for example manually by an installer.

FIG. 6B shows a next state for the example network of FIG. 6A, wherein a new node N4 is added in lighting group B, for example manually by an installer. Initially, the node N4 may be in a discovery state, wherein it is sufficiently near to the gateway GW1 to establish a direct link L4 and the CMS commissions node N4. This status is indicated in the node best path table 151 in the CMS 101.

Figure 6C:
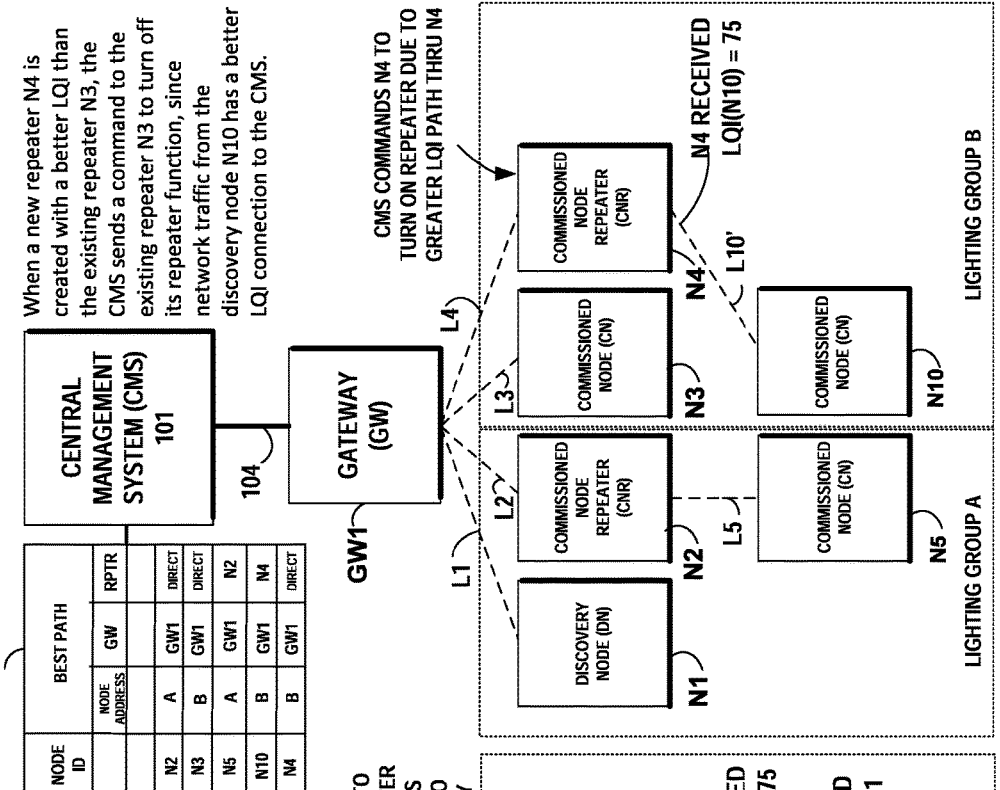
FIG. 6C shows a next state for the example network of FIG. 6B, wherein the CMS begins a trial traffic rebalancing period to determine whether the new repeater N4 may provide a greater LQI for a communication path L10' from commissioned node N10 through N4 to GW1, than the existing LQI for the existing communication path L10 from commissioned node N10 through N3 to GW1.

FIG. 6C shows a next state for the example network of FIG. 6B, wherein the CMS begins a trial traffic rebalancing period to determine whether the new repeater N4 may provide a greater LQI for a communication path L10' from commissioned node N10 through N4 to GW1, rather than the existing LQI for the existing communication path L10 from commissioned node N10 through N3 to GW1. The CMS 101 decommissions the node N10 (through the repeater node N3) so that N10 becomes a discovery node and resumes the discovery process shown in FIG. 3D. Then the CMS 101 commands the node N3 to turn off its repeater function. The receive LQI for the messages received at new commissioned repeater node N4 over link L10' from the commissioned node N10 is LQI=75. This status is indicated in the node best path table 151 in the CMS 101.

Figure 6D:
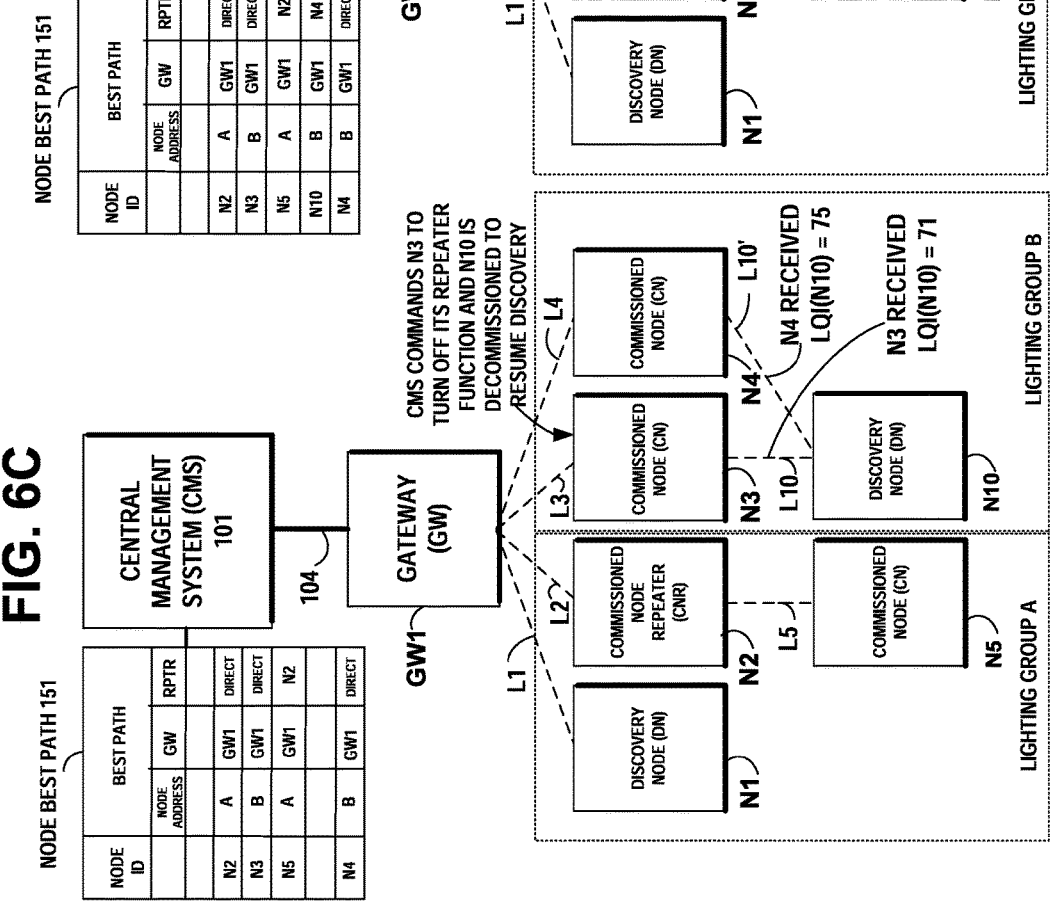
FIG. 6D shows a next state for the example network of FIG. 6C, wherein the CMS 101 rebalances repeater traffic after determining that the new repeater N4 provides a greater LQI for the communication path L10' from commissioned node N10 through N4 to GW1.

FIG. 6D shows a next state for the example network of FIG. 6C, wherein the CMS 101 determines that the new repeater N4 provides a greater LQI for the communication path L10' from commissioned node N10 through N4 to GW1. The CMS 101 performs traffic rebalancing and commands the commissioned node N4 to turn on its repeater function due to the greater LQI path L10' through N4. As a result of the node N10 performing the discovery process shown in FIG. 3B, the best path is identified as link L10' through commissioned node repeater N4. This status is indicated in the node best path table 151 in the CMS 101.

In one embodiment the CMS 101 may use the node addressing scheme to select the existing communication path L10 from commissioned node N10 through N3 to GW1, for a trial traffic rebalancing period in the example of FIGS. 6A-6D. The traffic rebalancing period may be triggered by the installation of a new discovery node N4 that is within range of the gateway GW1. Either the installer or a pre-existing lighting plan will have stored into the memory of the newly installed lighting node N4, one or more of the values for customer ID, site ID, network ID, lighting group ID, device node ID, nearest street address, GPS information and device type, which may indicate processor size and storage size. The discovery node N4 broadcasts a discovery message, including its stored address, which is received by the gateway GW1, and the node N4 becomes a commissioned node, as described in FIG. 2A. The CMS stores the address in the node best path table 151.

The trial traffic rebalancing period may be triggered in the CMS 101 by the addition of the new node N4 in the example of FIGS. 6A-6D. The CMS may compare one or more values in the address for the new node N4 with the addresses for other commissioned node repeaters in either the same site, or the same network, or the same group, or over multiple networks. The lighting nodes may be grouped by any number of criteria such as: adherence to an intended network design or lighting plan, proximity grouping of devices, services grouping of devices (parks, trails, streets, bridges, parking lots etc.) functional grouping of devices (ones with motion detectors or cameras) etc.

In the example of FIGS. 6A-6D, the CMS looks for addresses of existing repeater nodes in the same Group B in the node best path table 151. The CMS then looks for commissioned nodes in Group B, which are currently using another repeater node in Group B. When a commissioned node meeting this criterion, such as N10, is identified, the CMS performs the trial traffic rebalancing on commissioned node N10 and existing repeater node N3, to determine if substituting the new node N4 as a repeater node, replacing the existing repeater node N3, would provide a greater LQI for a communication path L10' from commissioned node N10 through N4 to GW1.

In other embodiments of the invention, a traffic bottleneck threshold value may be established in the CMS 101. The CMS may periodically review the node best path table 151 to determine if there is any commissioned node repeater represented in the table, which is creating a bottleneck by handling a number of repeated links that exceeds the traffic bottleneck threshold value. If such a bottleneck repeater node is found, this circumstance may trigger a trial traffic rebalancing period by the CMS.

For example, if the address of a bottleneck repeater is identified as Group A, the CMS may review the node best path table 151, looking for target repeater nodes having addresses in Group A, which are currently handling fewer repeated links than the traffic bottleneck threshold value. For each target repeater node found, the CMS looks for candidate commissioned nodes being handled by the bottleneck repeater, whose addresses indicate that they are within range of the target repeater node. When a such a candidate commissioned node is identified, the CMS performs the trial traffic rebalancing on the candidate commissioned node and the target repeater node, similar to that shown in FIG. 6C, to determine if substituting the target repeater node as a repeater node, replacing the bottleneck repeater node, would provide a greater LQI or a more efficient communication path from the candidate commissioned node through the target repeater node to the gateway. In another embodiment, the CMS determines if substituting the target repeater node as a repeater node, replacing the bottleneck repeater node, would provide a repeater with a larger processor size and/or a larger storage size for a more efficient communication path from the candidate commissioned node through the target repeater node to the gateway.

In other example embodiments of the invention, the CMS may perform load balancing of repeater nodes by individual groups, as indicated by the service group ID or functional group ID indicated in the group ID of the node address. In this manner, load balancing of repeater nodes may be selected by the CMS under a network design or lighting plan, proximity grouping of devices, services grouping of devices (parks, trails, streets, bridges, parking lots etc.) functional grouping of devices (associated with motion detectors or cameras).

Therefore, the CMS may perform load balancing of repeater nodes in accordance with different relative priorities to network traffic handled by groups. This is accomplished by repeater activation or the assignment of traffic from a new node to an existing repeater, as indicated by the service group ID or functional group ID indicated in the group ID of the node address. For example, those nodes having the largest processor, largest amount of storage, or best connections would be selected by the CMS to handle the most important traffic having the highest relative priority, such as safety and security traffic from nodes associated with security cameras or motion detectors. A services group with security cameras has traffic that is more important and is a higher relative priority than traffic from a grouping of simple street lights. Accordingly, the repeater selection criterion to support prioritized load balancing gives nodes associated with cameras, for example, the fastest path through the most powerful repeaters for a more efficient communication path.

Lighting node traffic from different groups may intersect at the same repeater. In this circumstance, the repeater may not be turned off for re-balancing or in an outage, without potentially impacting the intersecting traffic from multiple lighting groups. This problem is solved in accordance with an embodiment of the invention, by the CMS directing repeater creation and path selection to assign traffic to specific repeaters that only support particular functional, services or geographically related groups of the lighting system.

Repeaters may be assigned by the CMS for network traffic or activated to only provide connectivity to dedicated groups of lights, such as lights in a park or highway lights. This provides a significant advantage. For example, when activating or deactivating repeaters for park lights or re-balancing park lighting node connectivity, existing repeater operation and repeater creation may remain unaffected in other non-park lighting node groupings. In these cases, when a new repeater is created or re-balancing of traffic flows is necessary the Repeater Approval Timer, 148, can be assigned by the CMS to only delay new repeater formation within that particular collection of lighting nodes. An individual RAT may be assigned to each functional group, park lighting groups, etc. Therefore, multiple Repeater Approval Timers, 148, may be created in the system with each individual RAT 148, associated with some service, functional, geographic grouping, or any grouping of lighting nodes made possible by a lighting plan. Different RAT timers may have different values, which may vary from long to short duration, to provide additional levels of priority between groups of lighting nodes by adjusting frequency and delays for repeater activation and subsequent traffic path assignment.

Although specific example embodiments of the invention have been disclosed, persons of skill in the art will appreciate that changes may be made to the details described for the specific example embodiments, without departing from the spirit and the scope of the invention.

What is claimed is:

1. A system for organizing lighting nodes in a lighting network, comprising:
   a central management system coupled to a wireless network, the central management system configured to organize and control a large array of lighting nodes;
   at least one lighting node in the wireless network, configured to receive a discovery message from another lighting node in the wireless network, and in response thereto, to transmit to the central management system, a request message including information from the discovery message and a request to invoke a repeater function in the at least one lighting node, for forwarding messages from the other lighting node to the central management system;
   the central management system configured to receive the request message from the at least one lighting node, to validate the information from the discovery message of the other lighting node, to determine a best path for communication of messages between the other lighting node and the central management system based on the information from the discovery message, and to cause a command to be transmitted to the at least one lighting node to invoke the repeater function in the at least one lighting node; and
   a repeater approval timer in the central management system, configured to prevent other lighting nodes in the wireless network, from respectively invoking a repeater function in the respective other lighting nodes during a delay interval that the central management system starts when the command is transmitted to the at least one lighting node to invoke the repeater function in the at least one lighting node.

2. The system of claim 1, further comprising:
   one or more gateways in the wireless network, coupled to the central management system, configured to exchange wireless messages with lighting nodes within wireless communications range in the wireless network;
   wherein the other lighting node in the wireless network is out of the wireless communications range of the one or more gateways, and is within wireless communications range of the at least one lighting node.

3. The system of claim 1, wherein the validation of the information from the discovery message of the other lighting node, includes identification of the other lighting node in a whitelist and determination that the discovery message from the other lighting node has a link quality indication greater than or equal to a threshold value.

4. The system of claim 1, wherein the central management system is configured to receive two or more request messages from two or more lighting nodes, the two or more request messages requesting invoking a respective repeater function in the two or more lighting nodes, the two or more request messages derived from two or more respective discovery messages from the same other lighting node;
   the central management system configured to validate information from the two or more discovery messages, the information having been included in respective ones of the two or more request messages, to select one of the two or more lighting nodes based on the validation, and to cause a command to be transmitted to the selected lighting node to invoke the repeater function in the selected lighting node; and the repeater approval timer in the central management system, configured to prevent other lighting nodes in the wireless network, from respectively invoking a repeater function in respective other lighting nodes during a delay interval that the central management system starts when the command is transmitted to the selected lighting node to invoke the repeater function in the selected lighting node.

5. The system of claim 4, wherein the validation of the information from the two or more discovery messages, the information having been included in respective ones of the two or more request messages, includes respective identification of the two or more lighting nodes in a whitelist and determination that the link quality indication corresponding to the selected lighting node is greater than the link quality indication of others of the two or more lighting nodes.

6. The system of claim 4, wherein at least one of received link quality indication of the discovery message, propagation delay of the discovery message, respective service group ID of the two or more lighting nodes, respective functional group ID of the two or more lighting nodes, respective processor size of the two or more lighting nodes, respective storage size of the two or more lighting nodes, and relative priority of network traffic of a lighting group of which the other lighting node is a member, is information used by central management system to determine the best path for maximizing reliability or speed of communication between the other lighting node and the central management system.

7. The system of claim 1, wherein the repeater approval timer in the central management system starts the delay interval each time a command is transmitted to another lighting node to invoke the repeater function in the another lighting node, thereby preventing creation of an excess number of repeater nodes.

8. The system of claim 1, wherein the repeater approval timer provides at least one of variable delay intervals for invoking the repeater function in lighting nodes of at least one individual group of lighting nodes or different delay intervals for invoking the repeater function in lighting nodes of different ones of a plurality of groups of lighting nodes.

9. The system of claim 1, further comprising:
rebalancing repeater traffic, by the central management system, when a new commissioned node repeater is created with a better link quality indication, greater than an existing commissioned node repeater's link quality indication; and
sending, by the central management system, a command to the existing commissioned node repeater to turn off its repeater function, to improve network traffic from another node through the new commissioned node repeater, has a better link quality indication connection to the central management system.

10. A central management system for organizing lighting nodes in a lighting network, comprising:
a communications unit in the central management system, coupled to a wireless network, configured to communicate with a large array of lighting nodes in the wireless network;
the central management system configured to receive a request message from at least one lighting node including information from a discovery message of an initiating lighting node and a request to invoke a repeater function in the at least one lighting node, for forwarding messages from the initiating lighting node to the central management system;
the central management system configured to receive the request message from the at least one lighting node, to validate the information from the discovery message of the initiating lighting node, to determine a best path for communication of messages between the initiating lighting node and the central management system based on the information from the discovery message, and to cause a command to be transmitted to the at least one lighting node to invoke the repeater function in the at least one lighting node; and
a repeater approval timer in the central management system, configured to prevent other lighting nodes in the wireless network, from respectively invoking a repeater function in the respective other lighting nodes during a delay interval that the central management system starts when the command is transmitted to the at least one lighting node to invoke the repeater function in the at least one lighting node.

11. The central management system of claim 10, further comprising:
one or more gateways in the wireless network, coupled to the central management system, configured to exchange wireless messages with lighting nodes within wireless communications range in the wireless network;
wherein the other lighting node in the wireless network is out of the wireless communications range of the one or more gateways, and is within wireless communications range of the at least one lighting node.

12. The central management system of claim 10, wherein the validation of the information from the discovery message of the other lighting node, includes identification of the other lighting node in a whitelist and determination that the discovery message from the other lighting node has a link quality indication greater than or equal to a threshold value.

13. The central management system of claim 10, further comprising:
wherein the central management system is configured to receive two or more request messages from two or more lighting nodes, the two or more request messages requesting invoking a respective repeater function in the two or more lighting nodes, the two or more request messages derived from two or more respective discovery messages from the same other lighting node;
the central management system configured to validate information from the two or more discovery messages, the information having been included in respective ones of the two or more request messages, to select one of the two or more lighting nodes based on the validation, and to cause a command to be transmitted to the selected lighting node to invoke the repeater function in the selected lighting node; and
the repeater approval timer in the central management system, configured to prevent other lighting nodes in the wireless network, from respectively invoking a repeater function in respective other lighting nodes during a delay interval that the central management system starts when the command is transmitted to the selected lighting node to invoke the repeater function in the selected lighting node.

14. The central management system of claim 13, wherein the validation of the information from the two or more discovery messages, the information having been included in respective ones of the two or more request messages, includes respective identification of the two or more lighting nodes in a whitelist and determination that the link quality indication corresponding to the selected lighting node is greater than the link quality indication of others of the two or more lighting nodes.

15. The central management system of claim 13, wherein at least one of received link quality indication of the discovery message, propagation delay of the discovery message, respective service group ID of the two or more lighting nodes, respective functional group ID of the two or more lighting nodes, respective processor size of the two or more lighting nodes, respective storage size of the two or more lighting nodes, and relative priority of network traffic of a lighting group of which the other lighting node is a member, is information used by central management system to determine the best path for maximizing reliability or speed of communication between the other lighting node and the central management system.

16. The central management system of claim 10, wherein the repeater approval timer in the central management system starts the delay interval each time a command is transmitted to another lighting node to invoke the repeater function in the another lighting node, thereby preventing creation of an excess number of repeater nodes in the wireless network.

17. The central management system of claim 10, further comprising:
rebalancing repeater traffic, by the central management system, when a new commissioned node repeater is created with a better link quality indication, greater than an existing commissioned node repeater's link quality indication; and
sending, by the central management system, a command to the existing commissioned node repeater to turn off its repeater function, to improve network traffic from another node through the new commissioned node repeater, has a better link quality indication connection to the central management system.

18. The central management system of claim 10, wherein the repeater approval timer provides at least one of variable delay intervals for invoking the repeater function in lighting nodes of at least one individual group of lighting nodes or different delay intervals for invoking the repeater function in lighting nodes of different ones of a plurality of groups of lighting nodes.

19. A method for operating a central management system for organizing lighting nodes in a lighting network, comprising:
communicate with a large array of lighting nodes in the wireless network;
receive a request message from at least one lighting node including information from a discovery message of an initiating lighting node and a request to invoke a repeater function in the at least one lighting node, for forwarding messages from the initiating lighting node to the central management system;
validate the information from the discovery message of the initiating lighting node, to determine a best path for communication of messages between the initiating lighting node and the central management system based on the information from the discovery message, and to cause a command to be transmitted to the at least one lighting node to invoke the repeater function in the at least one lighting node; and
prevent other lighting nodes in the wireless network from respectively invoking a repeater function in the respective other lighting nodes during a delay interval that the central management system starts when the command is transmitted to the at least one lighting node to invoke the repeater function in the at least one lighting node.

20. The method for operating a central management system of claim 19, further comprising:
wherein the central management system is configured to receive two or more request messages from two or more lighting nodes, the two or more request messages requesting invoking a respective repeater function in the two or more lighting nodes, the two or more request messages derived from two or more respective discovery messages from the same other lighting node;
validate information from the two or more discovery messages, the information having been included in respective ones of the two or more request messages, to select one of the two or more lighting nodes based on the validation, and to cause a command to be transmitted to the selected lighting node to invoke the repeater function in the selected lighting node; and
prevent other lighting nodes in the wireless network, from respectively invoking a repeater function in respective other lighting nodes during a delay interval that the central management system starts when the command is transmitted to the selected lighting node to invoke the repeater function in the selected lighting node.

21. The method for operating a central management system of claim 19, wherein the repeater approval timer in the central management system starts the delay interval each time a command is transmitted to another lighting node to invoke the repeater function in the another lighting node, thereby preventing creation of an excess number of repeaters in the wireless network.

* * * * *